United States Patent [19]
Kiefer et al.

[11] Patent Number: 5,576,034
[45] Date of Patent: Nov. 19, 1996

[54] APPARATUS FOR THE PRODUCTION OF HOLLOW BODIES FROM THERMOPLASTIC MATERIAL BY AN EXTRUSION BLOW MOLDING PROCESS

[75] Inventors: Erich Kiefer, Bonn; Karsten Friedrichs, Bad Honnef; Klaus Baltes, Bergheim, all of Germany

[73] Assignee: Krupp Kautex Maschinenbau GmbH, Bonn, Germany

[21] Appl. No.: 383,383

[22] Filed: Feb. 3, 1995

[30] Foreign Application Priority Data

Feb. 7, 1994 [DE] Germany ............... 44 03 698.1

[51] Int. Cl.$^6$ ............... B29C 49/04
[52] U.S. Cl. ............... 425/532; 425/537; 425/538; 425/541
[58] Field of Search ............... 425/532, 192 R, 425/541, 538, 539, 190, 537

[56] References Cited

U.S. PATENT DOCUMENTS

| | | | |
|---|---|---|---|
| 3,640,661 | 2/1972 | Gasior et al. | 425/538 X |
| 3,728,063 | 4/1973 | Langecker | 425/524 |
| 3,998,576 | 12/1976 | Frohn et al. | 425/532 |
| 4,022,561 | 5/1977 | Strong | 425/532 |
| 4,738,612 | 4/1988 | Kikuchi et al. | 425/541 X |
| 5,208,049 | 5/1993 | Hatfield et al. | 425/190 X |
| 5,219,587 | 6/1993 | Seto et al. | 425/532 X |

FOREIGN PATENT DOCUMENTS

| | | |
|---|---|---|
| 1940483 | 2/1971 | Germany. |
| 2052460 | 5/1971 | Germany. |
| WO92/13703 | 8/1992 | WIPO. |
| WO93/23232 | 11/1993 | WIPO. |

*Primary Examiner*—Richard L. Chiesa
*Attorney, Agent, or Firm*—Panitch Schwarze Jacobs & Nadel, P.C.

[57] ABSTRACT

In an apparatus for the production of hollow bodies from thermoplastic material by use of extrusion blow molding, having at least two blow molding units and an extrusion system, in an operating cycle each blow molding unit is movable between a receiving position in which the opened blow molding mold receives a preform and at least one other position in which the expanded hollow body is removed from the blow molding mold. Each blow molding unit is firstly moved from a station remote from the removal station in at least one direction into the removal station and opened after reaching the removal station, whereupon the hollow body previously produced in the blow molding mold is removed. The respective blow molding unit is then moved by use of a second movement in another direction, with the blow molding mold open, into the receiving position which is arranged laterally displaced relative to the path of movement along which the blow molding unit is moved into the removal station.

33 Claims, 16 Drawing Sheets

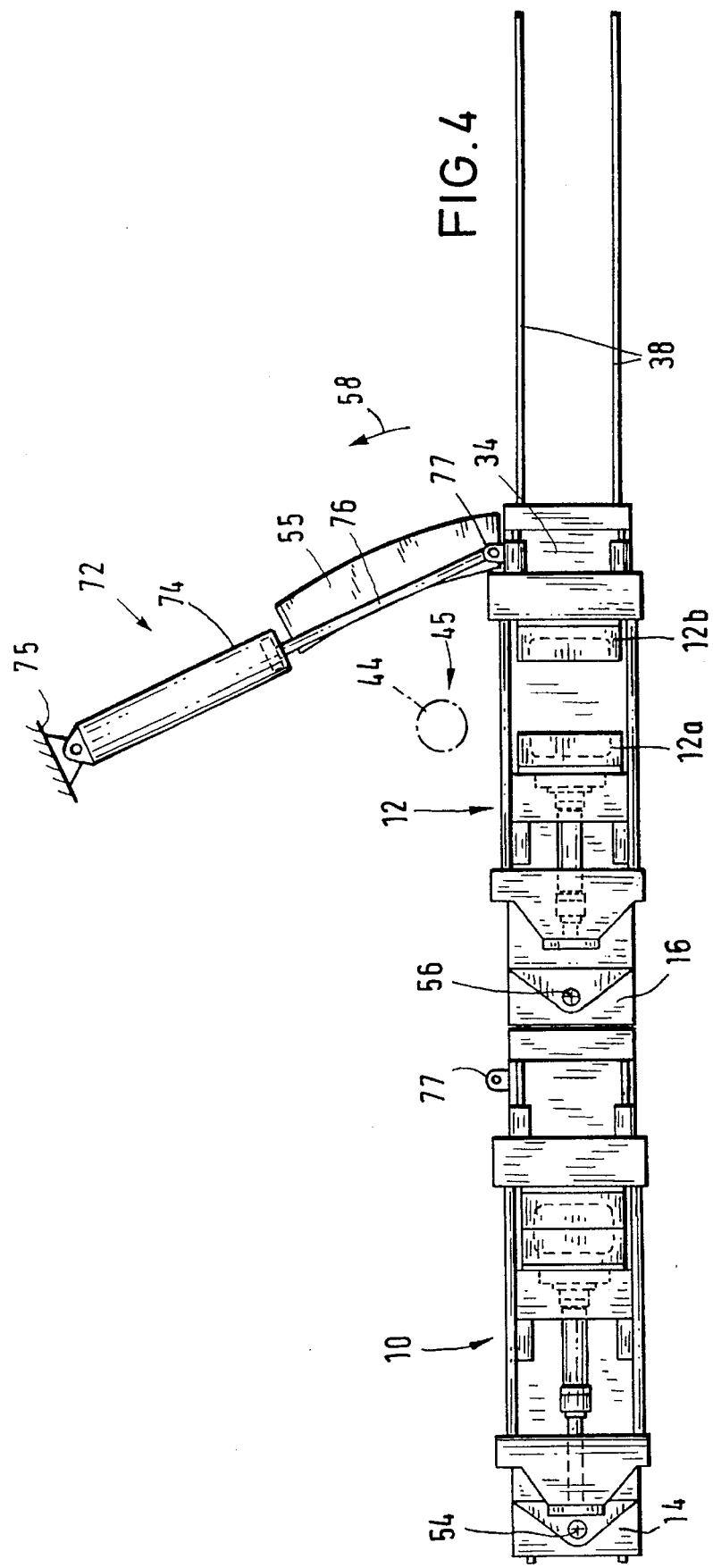

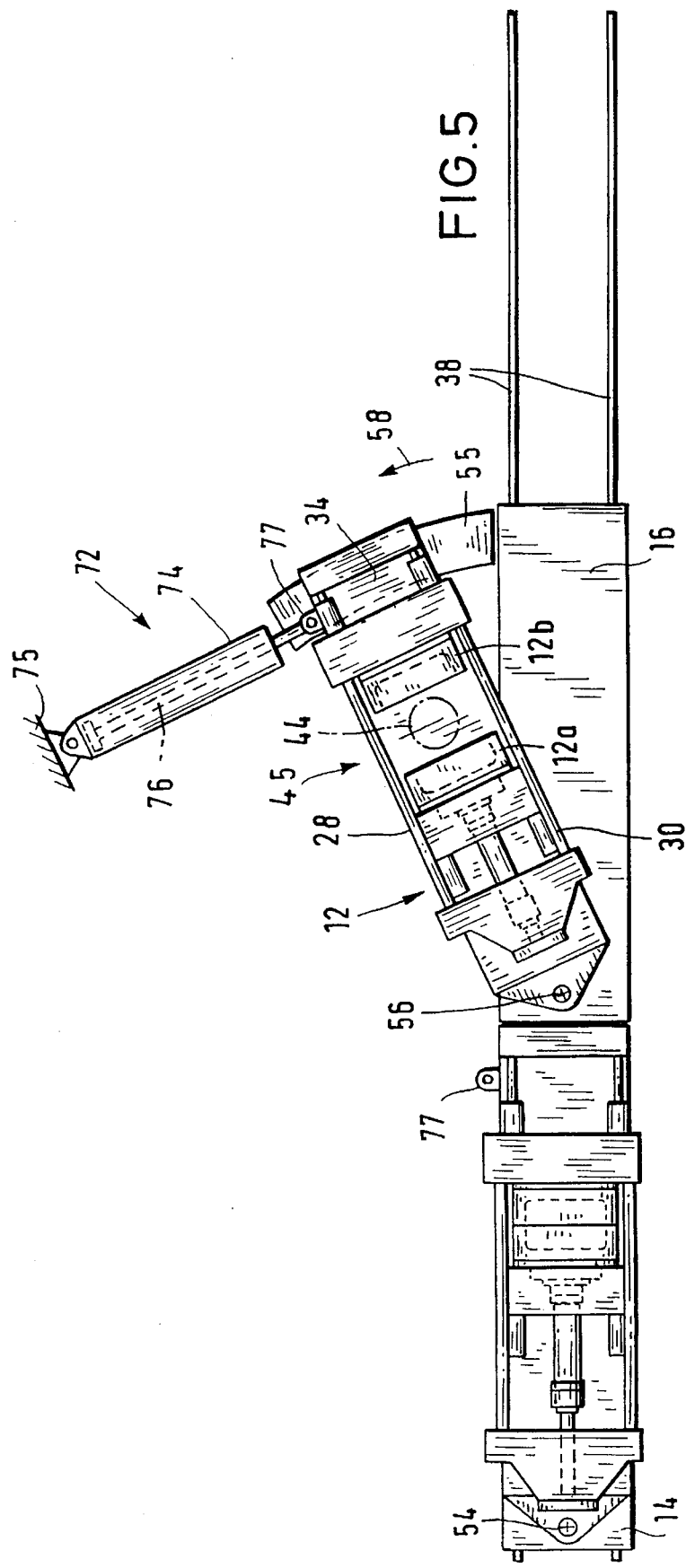

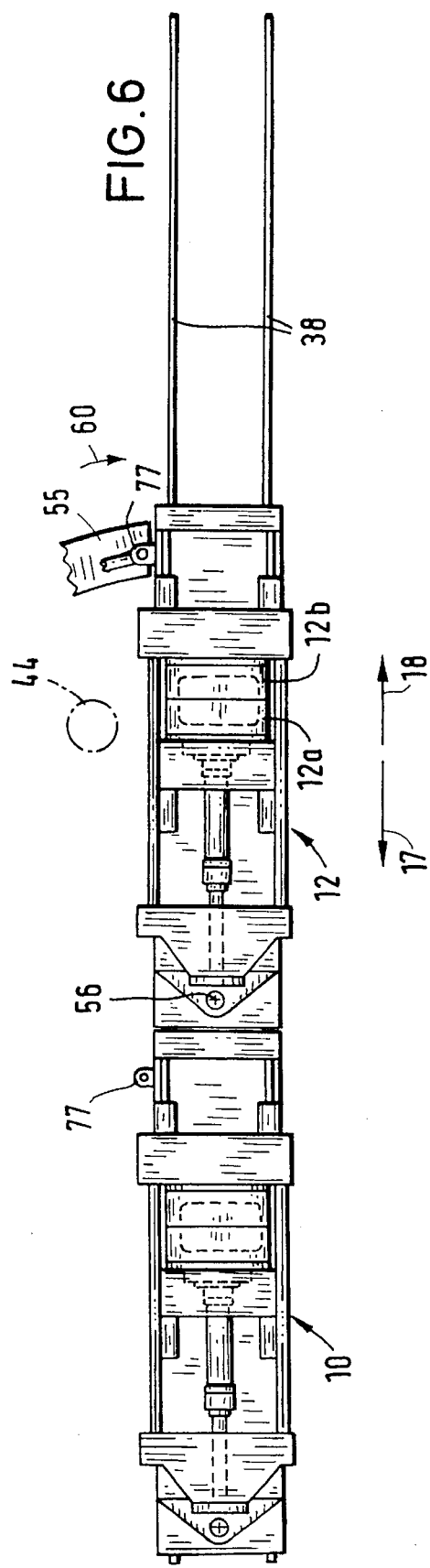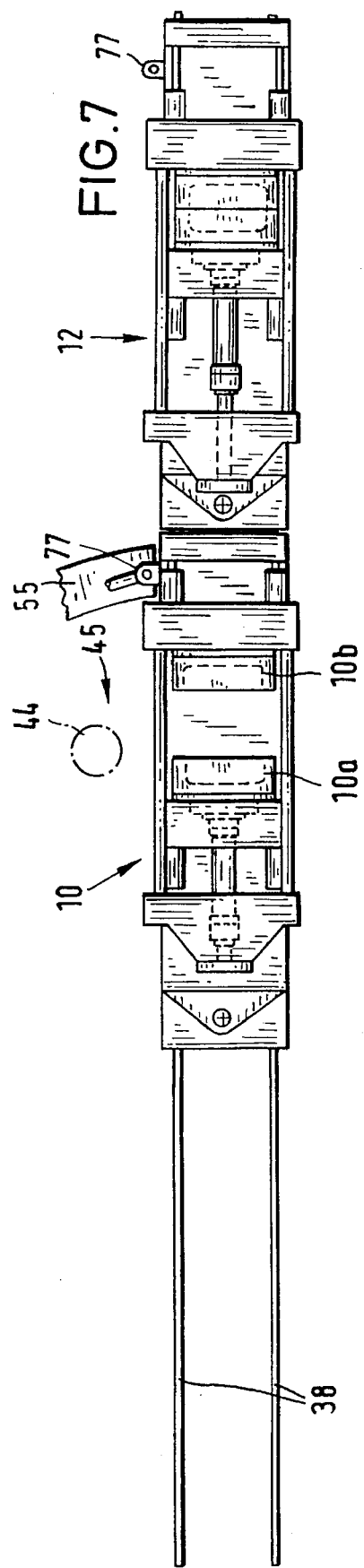

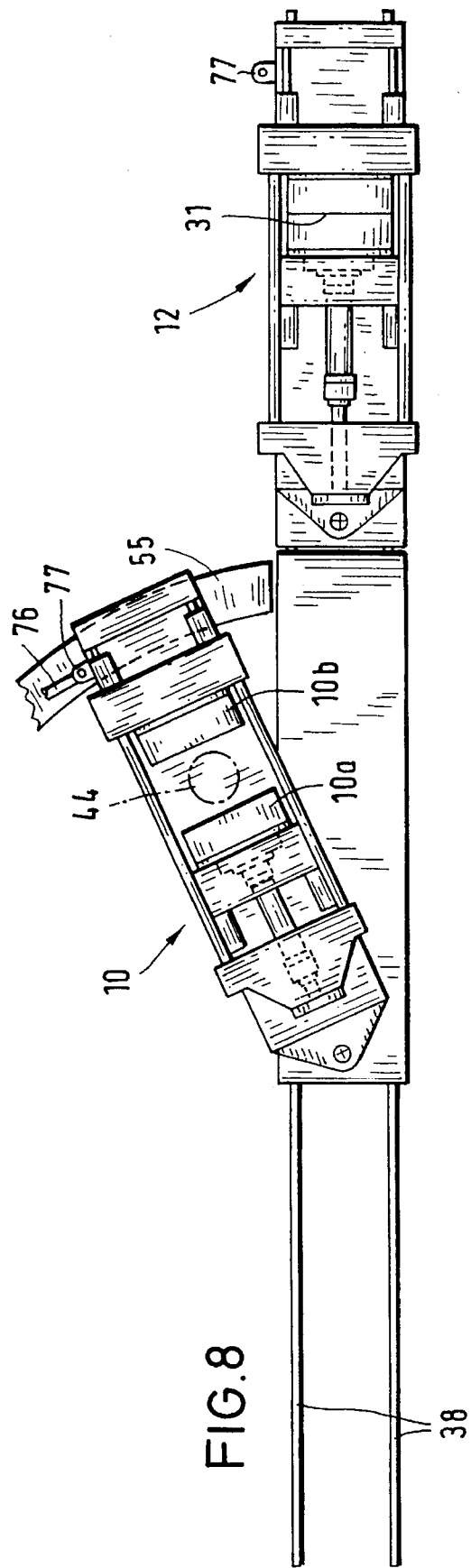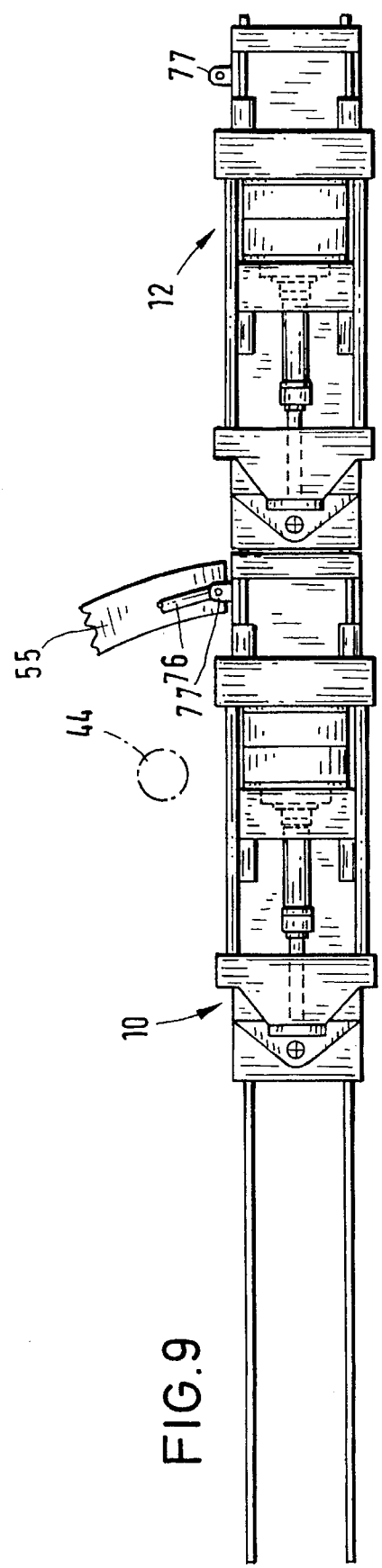

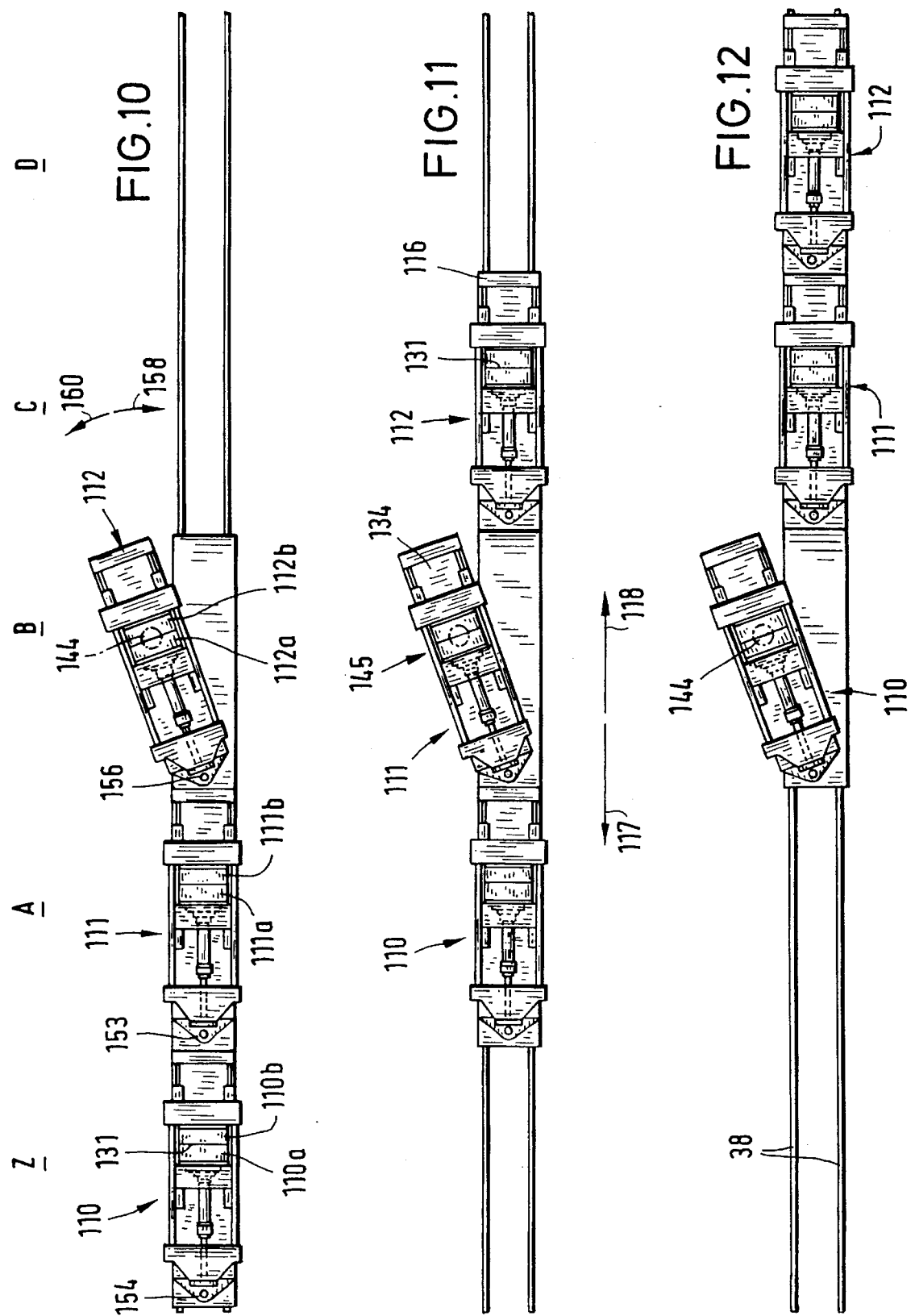

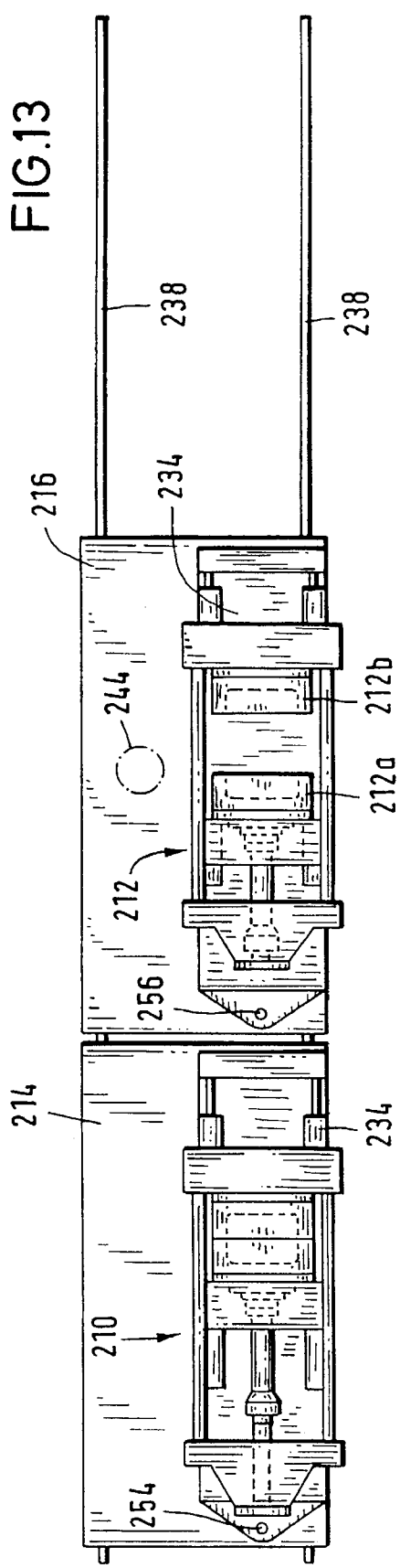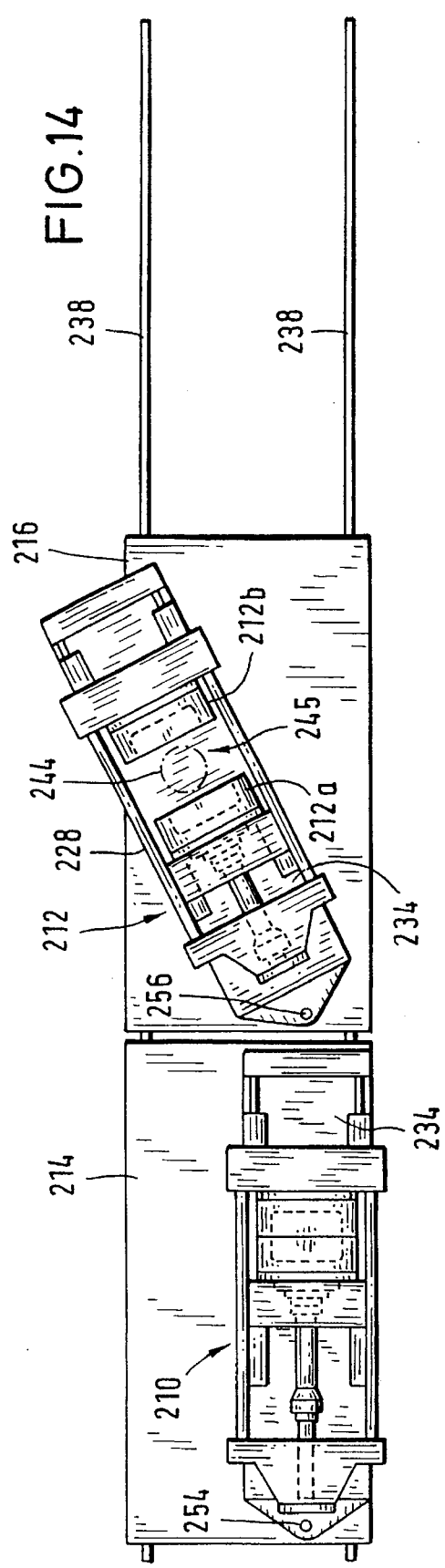

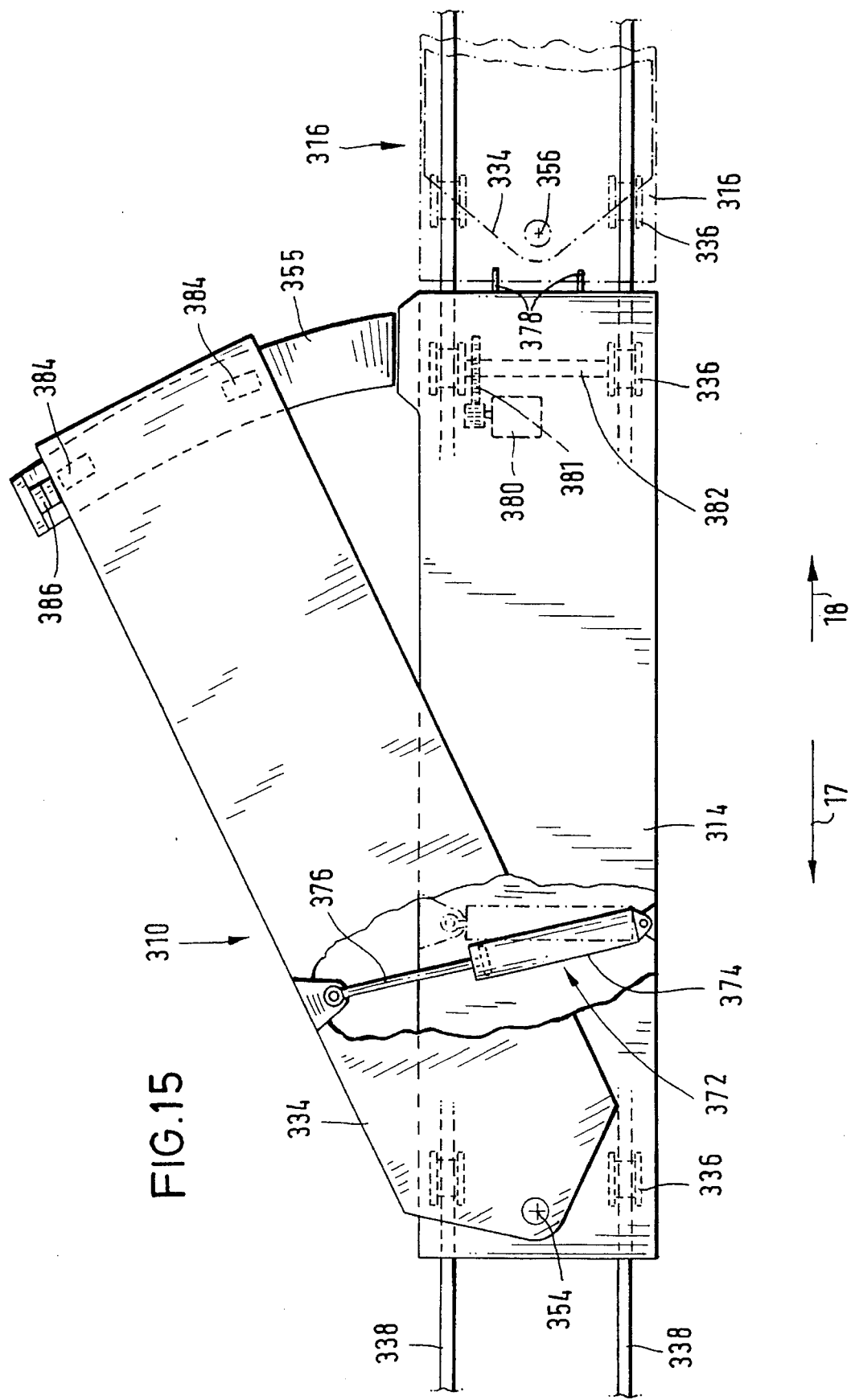

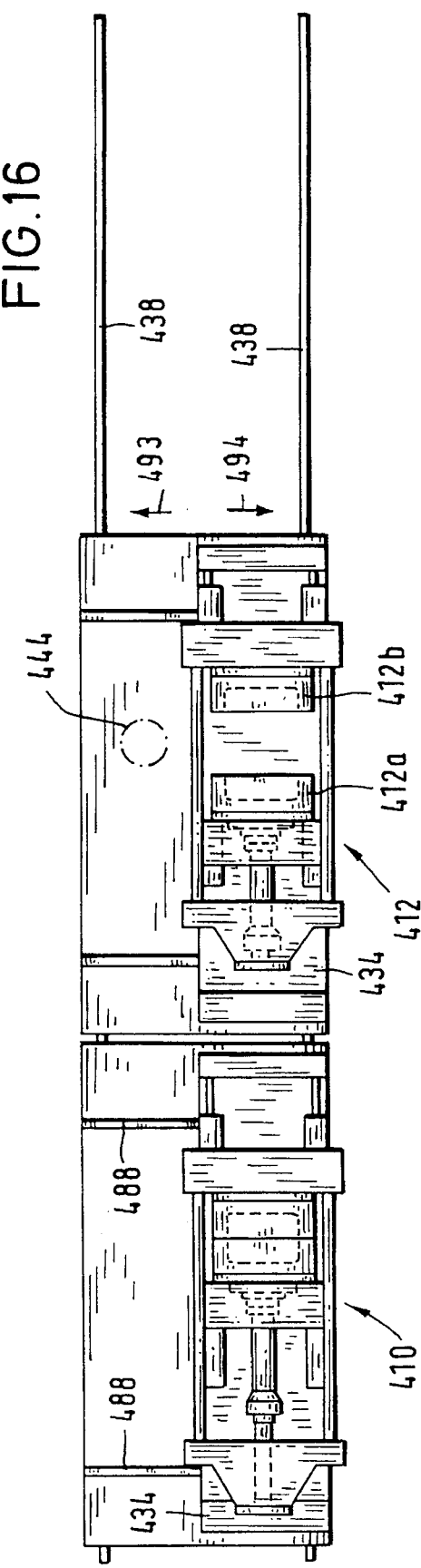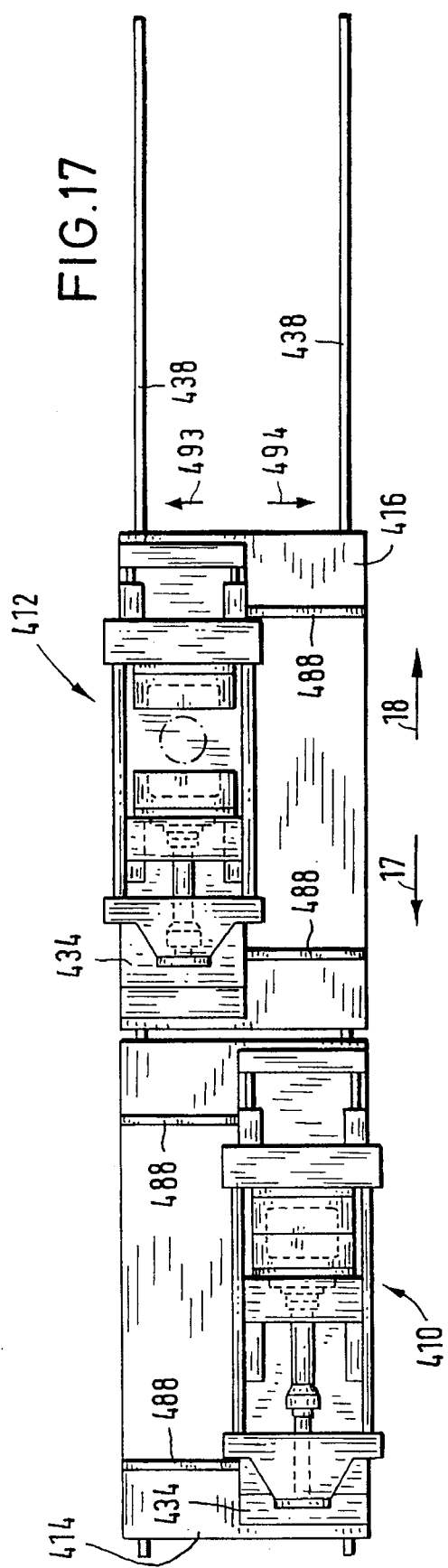

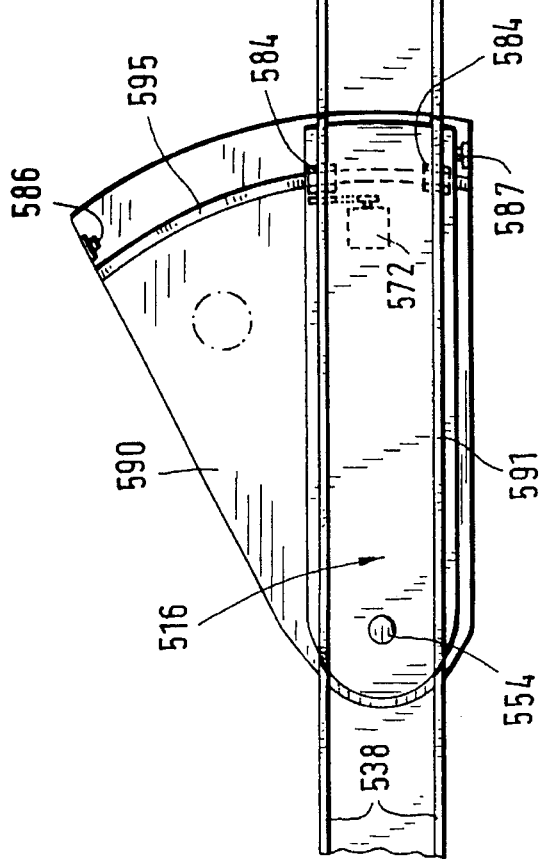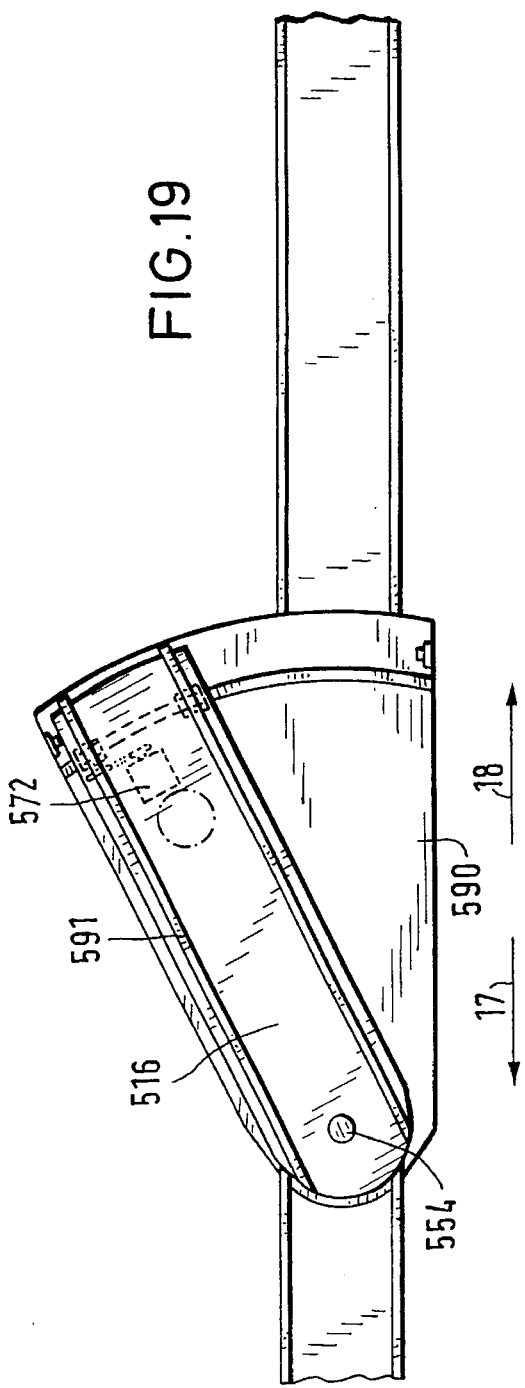

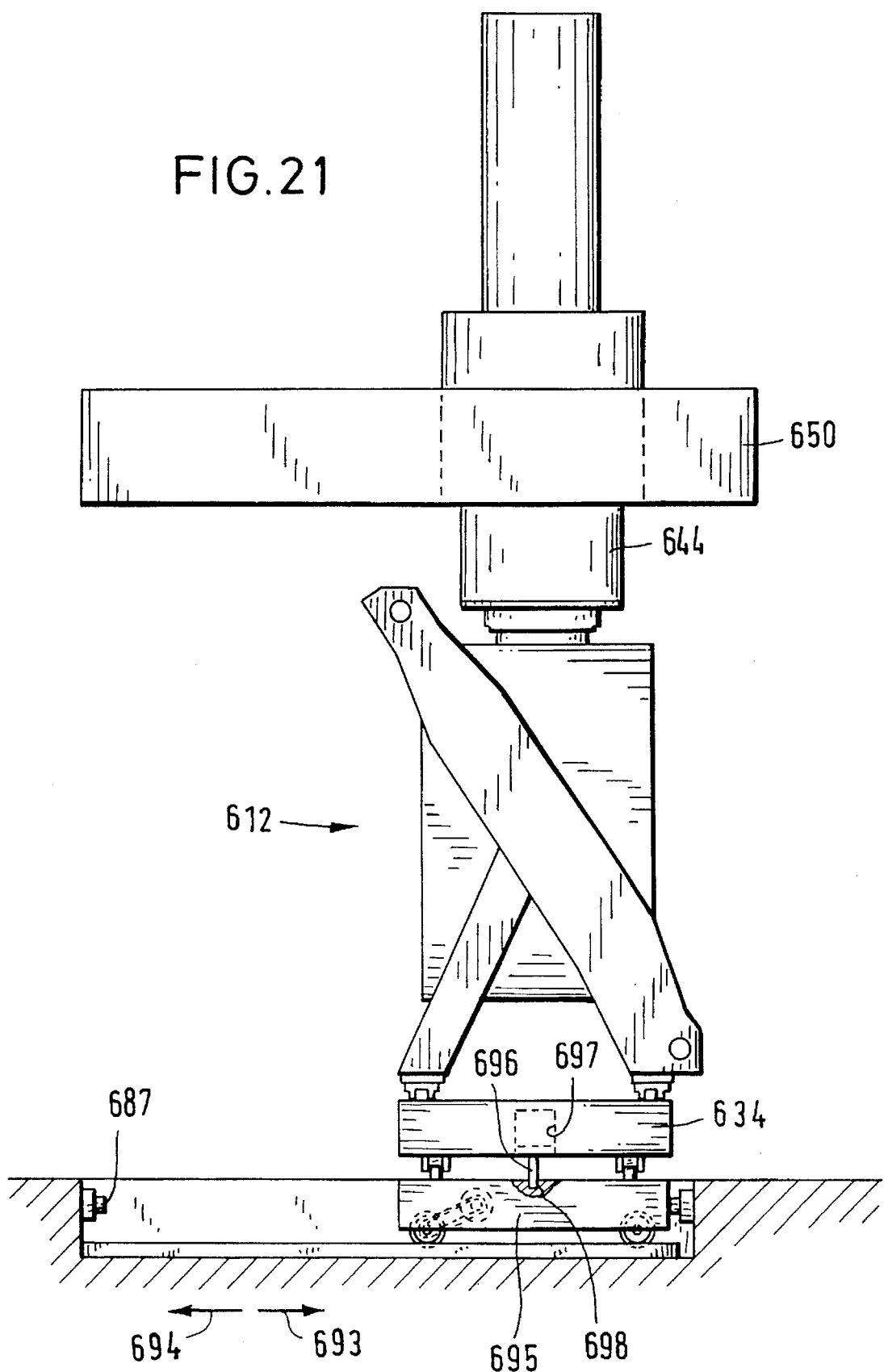

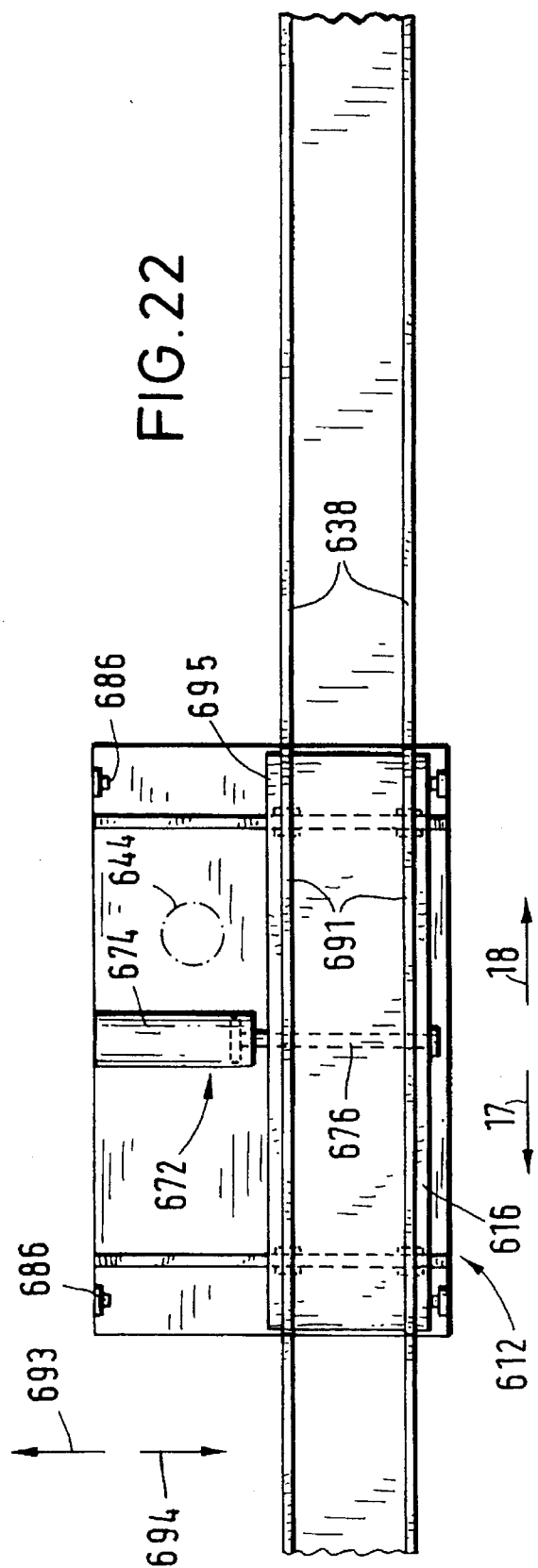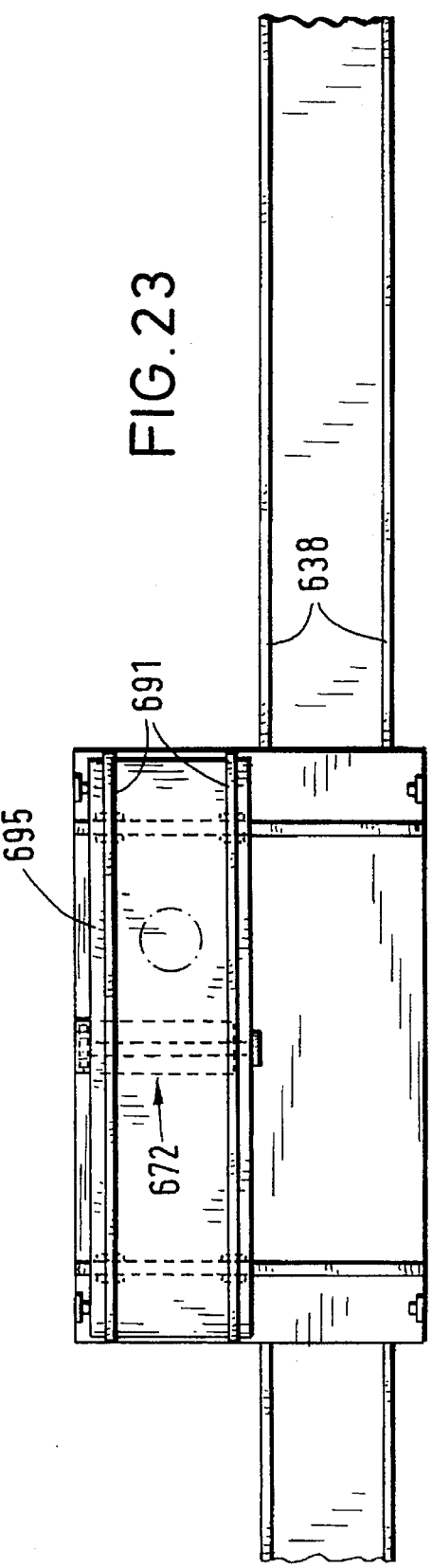

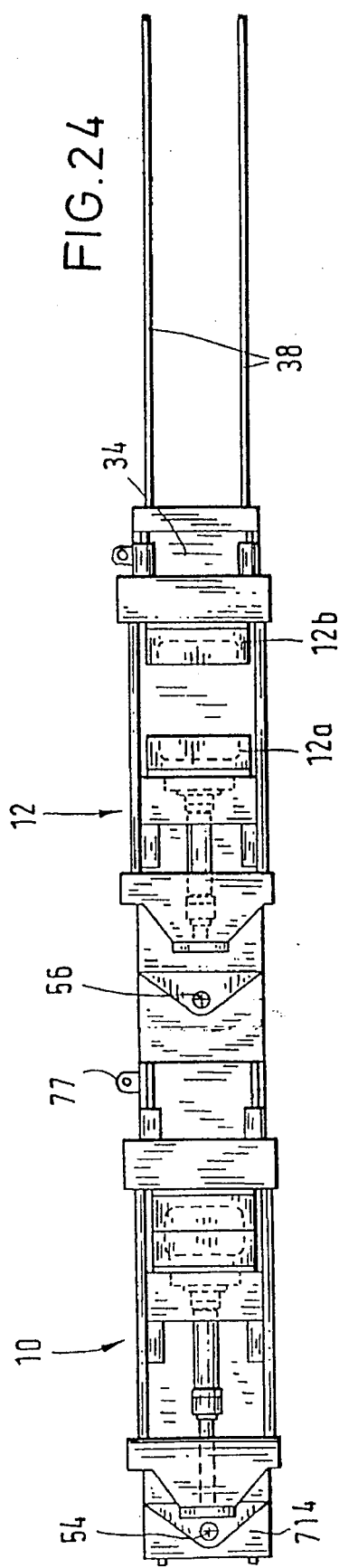

APPARATUS FOR THE PRODUCTION OF HOLLOW BODIES FROM THERMOPLASTIC MATERIAL BY AN EXTRUSION BLOW MOLDING PROCESS

BACKGROUND OF THE INVENTION

A number of operating procedures for the production of hollow bodies from thermoplastic material by an extrusion blow molding process, particularly in the case of producing relatively large hollow bodies such as barrels or motor vehicle tanks, involve the use of at least two blow molding molds associated with an extrusion head. The blow molding molds are moved selectively into a receiving position, for example beneath an extrusion head, in order to receive preforms which are extruded from the extrusion head. In that operation it is necessary for the blow molding molds to be arranged movably relative to the extrusion head, in such a way that, after a preform has been received by a blow molding mold, that mold is moved away in order to liberate the space beneath the extrusion head for the other blow molding mold to receive the respective following preform.

In continuous extrusion of the preforms, it is generally usual for the movement of the blow molding mold between the receiving station beneath the extrusion head and a station which is spaced away from the receiving station to take place substantially parallel to the separation surface of the blow molding mold. When the blow molding mold parts are of a symmetrical configuration, that separation surface is the vertical plane of symmetry of the mold, being at any event a surface which extends not parallel but mostly perpendicularly to the directions of the mold opening and closing movements. The need for the movements of the blow molding mold between the receiving position and a position spaced therefrom to take place approximately parallel to the above-mentioned plane makes it possible for the two parts of the blow molding mold, in the opened condition thereof, upon movement into the receiving position, to be guided laterally past the preform which is in the process of being formed and which may already involve the major part of its required length. In that respect, it is also possible for the blow molding mold to move along an arc portion as long as the radius of that arc is of such a size that the above-indicated requirements are met. Nonetheless, in a continuous extrusion procedure, the possible movements as between the blow molding mold and the preform which is in the receiving station are limited, unless particular additional steps are taken, for example by introducing the preform into the blow molding mold in the receiving station, by means of a gripper device for firstly removing the preform from the extrusion head which is disposed at a certain spacing from the receiving station. Thus, when such a mode of operation is employed, the extrusion head could be arranged at a spacing above the blow molding mold which is in the receiving station, that spacing approximately correspondingly to the target or reference length of the preform.

The limitations in regard to performance of the movements of the blow molding molds, which are imposed in continuous extrusion of the preform, can have a disadvantageous effect insofar as the operation of removing the hollow bodies which are produced by being expanded in the blow molding molds cannot be effected in a position which is common to the two blow molding molds and which is selectively adopted by the respective blow molding molds. On the contrary, in the above-indicated apparatuses the usual practice is that the blow molding molds, upon removal of the hollow bodies therefrom, adopt different positions, with the consequence that the devices required for removal of the hollow bodies and for further transportation thereof into some downstream-disposed treatment stations must be duplicated. That gives rise to a not inconsiderable level of expenditure, which increases with the size of the hollow bodies, as the transportation distances, removal devices, and downstream-disposed transportation means and other devices must inevitably be adapted to the size of the hollow bodies.

Moreover, when dealing with hollow bodies of relatively large size, for example motor vehicle tanks, it, is frequently necessary to introduce additional parts into the blow molding mold prior to closure thereof, for receiving the preform; such insertion parts when introduced into the mold are joined to the hollow body in the mold in the course of the operation of expanding the preform to constitute the hollow body. The insertion parts for example may involve installation components which are to be mounted in the interior of a tank, but they may also be reinforcing parts which are to be mounted on the outside. At any event the use of such insertion parts which must be introduced into the mold prior to closure thereof is of great practical significance, insofar as those parts must be correctly positioned in the blow molding mold with a great deal of care and generally in a very short time. The endeavor here is also that the at least two blow molding molds use a common station in which they are provided with the insertion parts to be introduced into the molds, so that essential members of the devices which are required for that operation can be jointly used by at least two blow molding units.

In discontinuous extrusion using an accumulator or storage head, the limitations and disadvantages described hereinbefore in relation to continuous extrusion are less pronounced, as there is greater freedom in regard to the movements of the at least two blow molding units. It is also possible for the two blow molding units to have a common station in which the hollow bodies are removed from the respective blow molding unit disposed at that station. A similar consideration applies in regard to the operation of introducing any parts which are to be joined to the hollow body in the blow molding mold. However discontinuous extrusion also requires the fulfilment of certain conditions, if for example the arrangement provides for both blow molding units a single common position in which the operation of removing the hollow bodies is effected.

SUMMARY OF THE INVENTION

An object of the present invention is to provide an apparatus for the production of hollow bodies from thermoplastic material by means of extrusion blow molding, such that in every case and including therefore in a continuous extrusion procedure, it is possible to provide for at least two blow molding units a single station in which the hollow bodies are removed from the blow molding units.

Another object of the present invention is to provide an apparatus for the production of thermoplastic hollow bodies by extrusion blow molding with the incorporation of at least one insertion part, which is so designed that the operation of feeding the insertion part to be joined to the hollow body in the blow molding mold is effected at a single position which is common to the two blow molding units.

Yet another object of the present invention is to provide an apparatus for producing hollow bodies from thermoplastic material by extrusion blow molding, which is of such a configuration that hollow bodies are removed from at least first and second blow molding units thereof at a single station at which an additional part to be joined to a hollow body produced in a molding unit can also be fed to the molding unit.

Still a further object of the invention is an apparatus for producing hollow bodies from preforms of thermoplastic material for blow molding wherein the major parts of the apparatus are easily accessible and easy to maintain.

According to the present invention the foregoing and other objects are attained by the apparatus set forth herein.

With this apparatus, it is readily possible for the hollow bodies to be removed from the blow molding molds of all blow molding units at one location and to be guided away from that location by suitable means such as a conveyor belt. A similar consideration applies in regard to the feed of insertion parts. In other words, in comparison with prior apparatuses, the means required for removal of the expanded hollow bodies and transporting them away can be concentrated at one location. A similar point also applies in regard to the means for feeding any additional insertion parts to be fitted and/or introducing them into the molds.

When reference is made herein to 'blow molding mold' and 'blow molding unit', that is intended to include the possibility that each blow molding mold may contain two or more blow molding cavities. Consequently, the term 'extrusion head' is also to be interpreted as meaning that it may include a plurality of discharge openings, the number of which corresponds to the number of blow molding cavities.

The term 'blow molding unit' also includes for example the structure carrying the blow molding mold parts, drive means and synchronising devices for the opening and closing movements of the blow molding mold parts, blowing mandrels or tubes or other means for the supply of compressed air for expanding the preforms in the blow molding mold.

The term 'continuous extrusion' used in this specification is not intended to exclude the possibility of the extrusion procedure being briefly interrupted, but rather it is to be interpreted as meaning that the procedure is such that, at the moment at which the blow molding mold is moved into the receiving station, for example beneath the extrusion head, the blow molding mold would collide with the at least one preform unless particular precautions are taken, for example by a suitable arrangement of the blow molding mold relative to the preform, for example along the lines of the above-mentioned arrangement of the blow molding mold parts in such a way that, upon moving into the receiving station, they are guided past a preform which is possibly already to be found there.

Particularly in the production of hollow bodies with a multi-layer or laminate wall, use is increasingly made of continuous extrusion of the preform. In that procedure, the preform which is also of a multilayer or laminate structure is produced by a co-extrusion process which, in the case of batch-wise extrusion, requires particular precautions in order to guarantee uniform and undisturbed formation of the individual layers of the preform and, in that respect, the article to be produced therefrom. The requirement for the additional measures mentioned above is due in particular to the point that batch-wise extrusion involves the occurrence of pressure fluctuations in the extrusion system, that is to say in the extrusion storage head and in the extruders associated therewith, and such pressure fluctuations can result in irregularities in distribution of the material forming the individual layers in the preform. In comparison, when continuous extrusion is used, the entire system consisting of extruders and extrusion head is maintained in a condition involving constant and uniform operating conditions, over prolonged periods of time, without serious difficulty, as the pressure and the flow speeds in the systems vary, if at all, only slowly and within close limits. Therefore for example certain layers can be formed substantially more uniformly and thus thinner. In addition an extrusion system for continuous extrusion is substantially cheaper.

BRIEF DESCRIPTION OF THE DRAWINGS

FIGS. 4–9 show the positions adopted by the two blow molding units in the course of the working cycles, FIGS. 10–12 show the positions adopted by the blow molding units in the course of the working cycles, in the case of an apparatus having three blow molding units, FIGS. 13 and 14 show plan views of a further embodiment in two different positions, FIG. 15 shows a plan view of a further embodiment, FIGS. 16 and 17 show plan views of a further embodiment in two different positions, FIGS. 18 and 19 show plan views of a further embodiment in two different positions, FIG. 21 is a view corresponding to that shown in FIG. 20 but with the blow molding unit in another position, FIGS. 22 and 23 are plan views of FIGS. 20 and 21 respectively, and FIG. 24 is a revised version of the apparatus of FIGS. 1 through 12.

DESCRIPTION OF PREFERRED EMBODIMENTS

Figure 1:
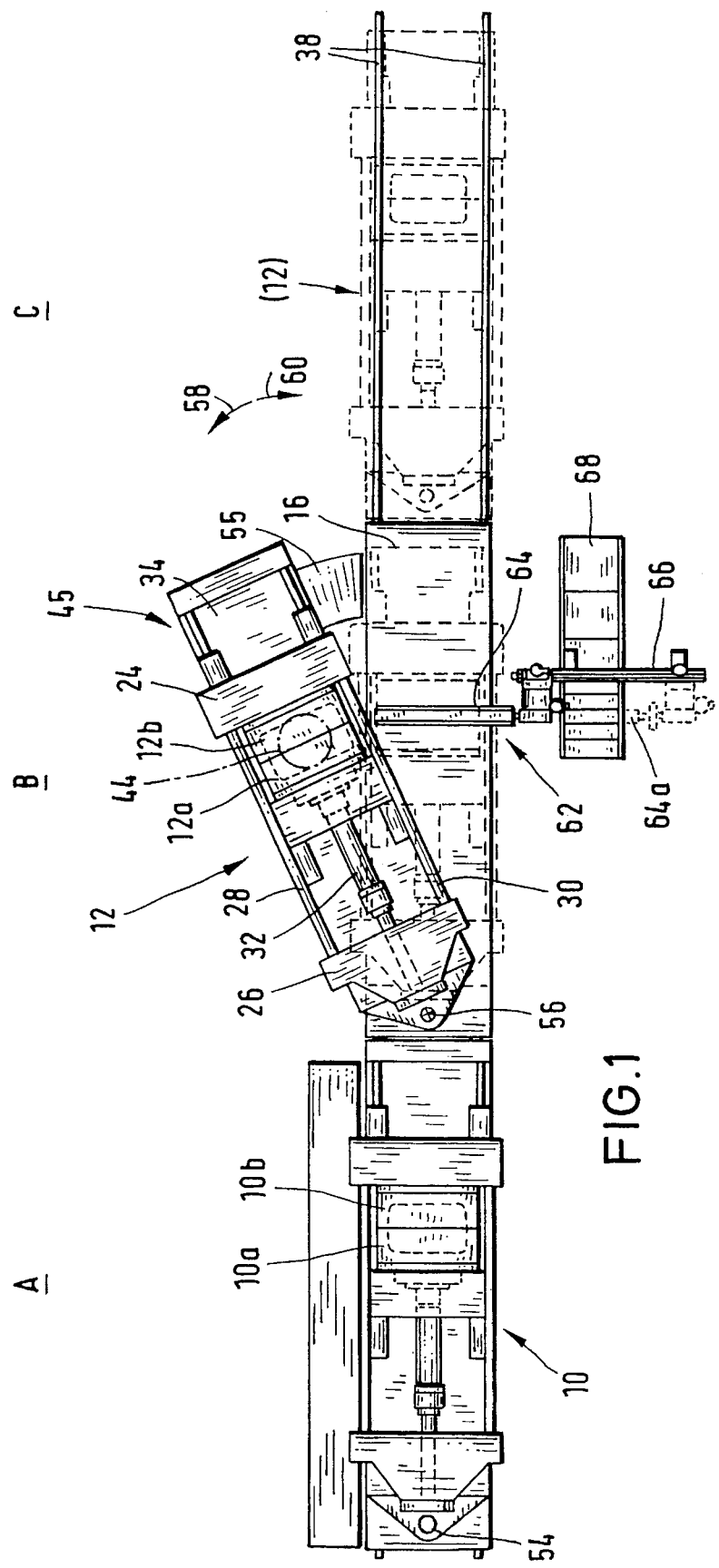
FIG. 1 is a plan view of an apparatus provided with two blow molding units, the extrusion system being omitted for the sake of improved clarity of the drawing.

The fundamental structure of the apparatus is firstly described hereinafter with reference to FIGS. 1 through 3. The embodiment illustrated therein comprises two blow molding units 10 and 12 which are arranged reciprocably in a horizontal plane. Each of the two blow molding units 10, 12 is provided with a carriage or slider 14 and 16 respectively which is movable for example on rails 38 in the direction indicted by the arrows 17 and 18. The to blow molding units 10 and 12 are each in the form of a push-pull clamping system comprising three plates, as will be described below. Each of the two mold halves 10a, 10b and 12a, 12b is carried by a carrier plate 20a, 20b and 22a, 22b respectively. The carrier plates 20a, 20b are mounted on approximately diagonally extending supports 24, 25, each of which represents one of the two plates of the push-pull clamping system. The third plate is formed by a support 26 which extends substantially parallel to the support 24 and which is connected by way of two spars or struts 28, 30 to the support 24 forming the first plate. A piston-cylinder unit 32 is arranged between the support 25 carrying the mold half 10a, and the support 26 representing the third plate, in such a way that, when the cylinder of that unit 32 is actuated, starting from the position of the parts shown in FIG. 2 of the drawings, the support 25 with the blow molding mold half 10a carried thereby moves towards the left, that is to say in the direction of the arrow 17, and the support 24 with the blow molding mold half 10b carried thereby moves towards the right, that is to say in the direction indicated by the arrow 18. In that situation the movement is transmitted to the support 24 from the support 26 by way of the two struts 28, 30 and a synchronization device (not shown) which is arranged between the supports 24 and 25. In the course of the above-described movement of the parts, the blow molding mold 10a, b is opened.

Actuation of the piston-cylinder unit 32 in the opposite direction results in closure of the blow molding mold 10a, b. FIG. 2 of the drawings shows both blow molding molds 10a, 10b and 12a, 12b respectively in the closed position.

In order to be able to produce the above-described opening and closing movements, the three supports 24, 25 and 26 are mounted displaceably in the directions of the arrows 17 and 18 on a support frame structure 34 which in turn is mounted on the carriage 14 pivotably approximately in a horizontal plane. In particular FIG. 3 shows that the supports 24, 25 and 26 can each be provided with a lateral strut 35. The supports 24, 25, 26 and the respective struts 35 are provided at their lower ends with wheels, rollers or the like 27 which are movable on guides 29 mounted on the frame structure 34 on the top thereof.

The carriages or sliders 14, 16 are also provided with wheels 36 which are guided on the rails 38. The rails 38 are laid on the ground 40.

The two blow molding units 10 and 12 are of the same configuration so that mutually corresponding parts are also denoted by the same references.

Figure 2:
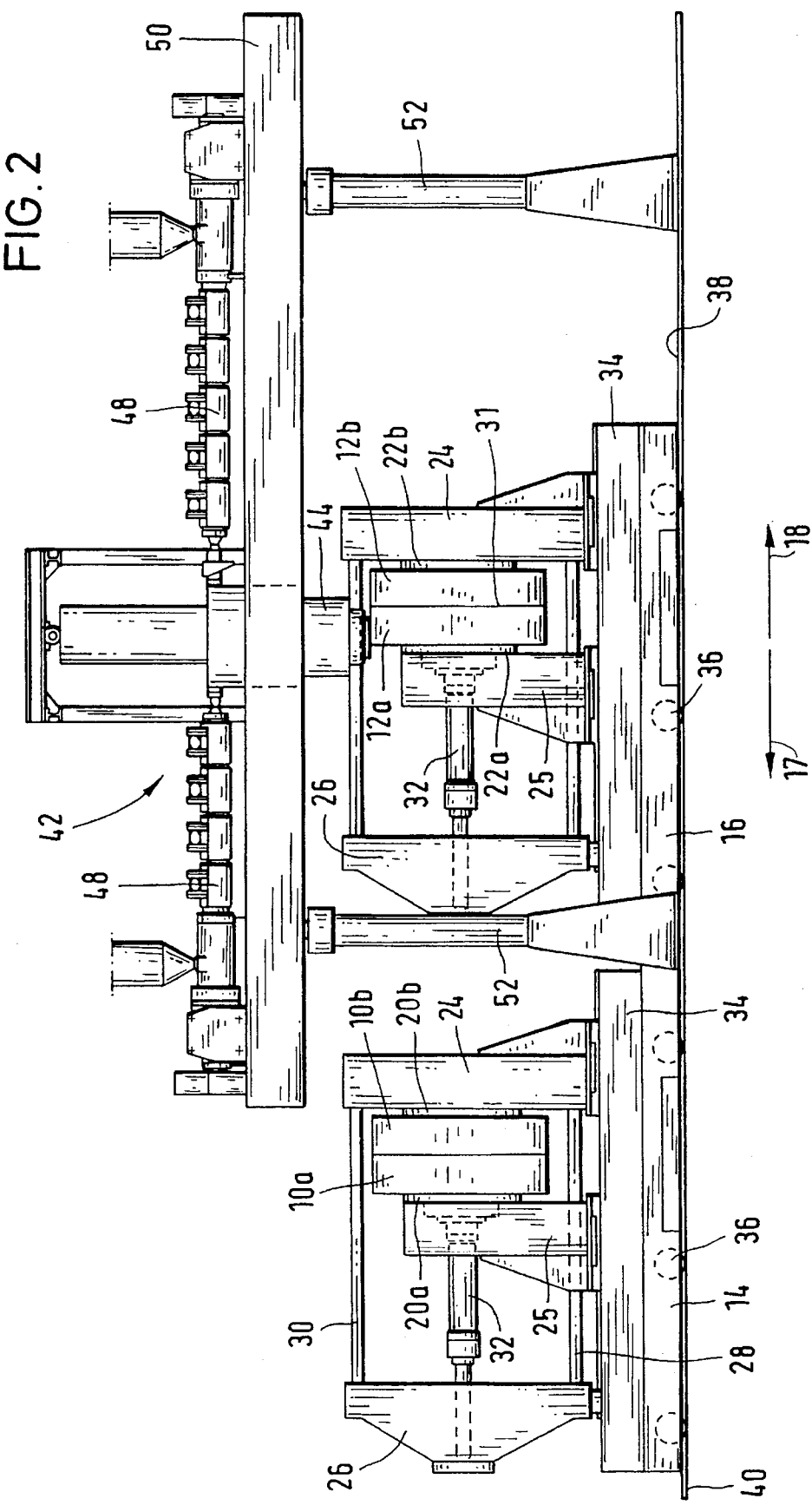
FIG. 2 is a front view of that apparatus with the extrusion system.
Figure 3:
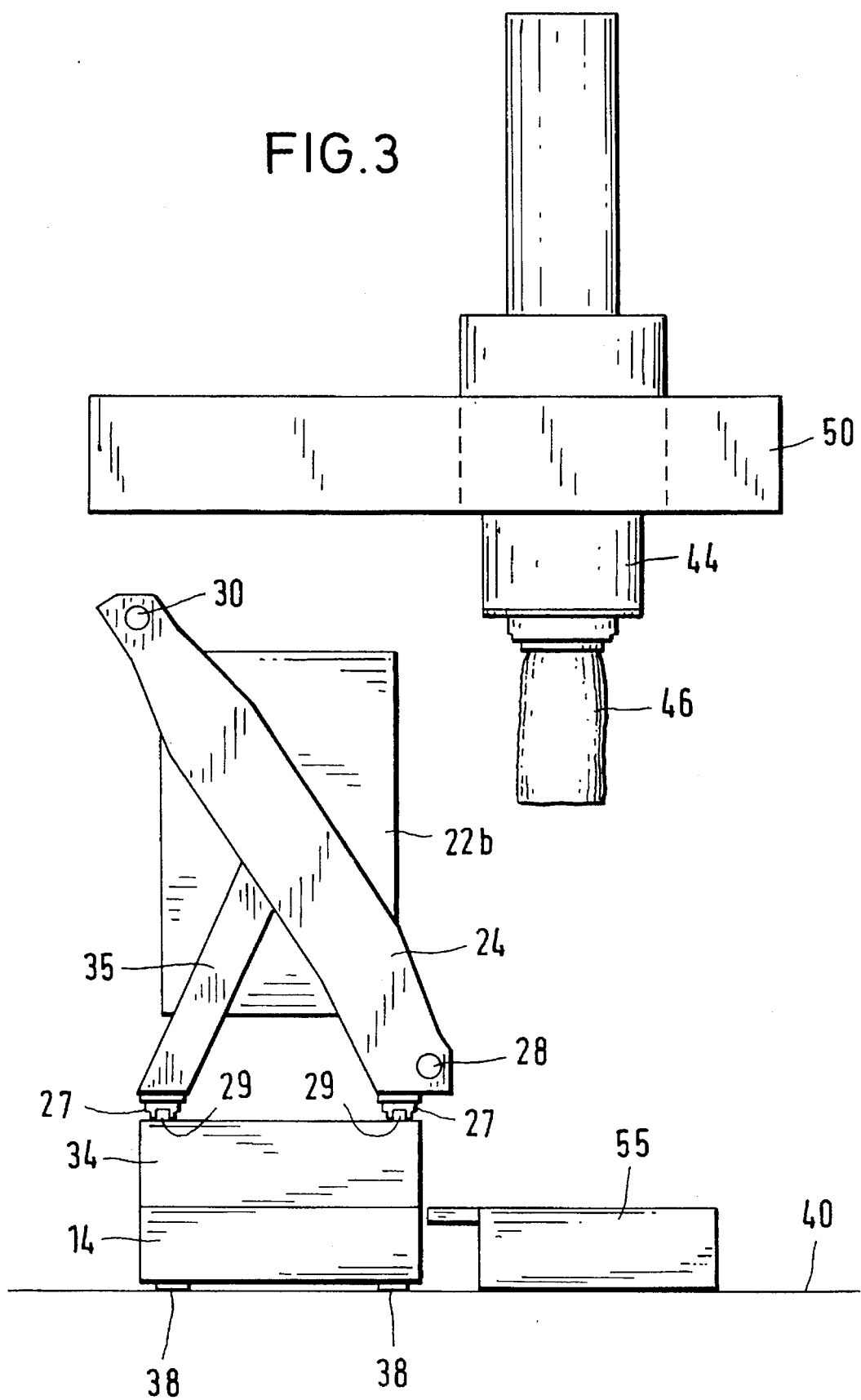
FIG. 3 is a side view of the apparatus.

In the embodiment shown in FIGS. 1 through 3, the carriages 14 and 16 which each carry a respective blow molding unit 10 and 12 respectively are shown as mutually independent components, with the result that the two carriages 14 and 16 can be moved independently of each other in the direction of the arrows 17 and 18. It is however also possible for the two carriages 14 and 16 to be coupled together or combined together to form a structural unit.

The apparatus is also provided with a continuously operating extrusion system 42 having an extrusion head 44 and two extruders 48 which convey the material plasticized therein into the extrusion head 44. The material issues at the lower end of the extrusion head 44, in the form of a generally tubular preform 46 (see FIG. 3). The preform is not shown in the other Figures of the drawings, for the sake of clarity of the drawings.

Although two extruders are shown in FIG. 2 of the drawings, it is possible for only one or more than two extruders to be associated with the extrusion head 44. More than two extruders are generally provided when a multilayer or laminate preform is co-extruded. The wall of the hollow body to be produced from the preform is then also of a correspondingly multi-layer or laminate configuration.

The extrusion head 44 and the extruder 48 with the associated drive means and feed devices are disposed on a platform 50 which in turn is carried by two supports 52 in a plane above the blow molding units 10, 12.

FIG. 3 in particular shows that the extrusion head 44 is arranged laterally beside the path of movement which is defined by the two rails 38 and along which the two blow molding units 10 and 12 are reciprocated in the direction of the arrows 17 and 18.

FIG. 1 in particular shows that the two frame structures 34 are each mounted on the respective carriage 14 and 16 pivotably about a respective pivot point 54 and 56 respectively, at the end of the respective frame structure 34 which is towards the support 26 serving as the third plate of the push-pull clamping system, the pivot mounting being for example by way of a pin or in some other suitable manner. As a result of that arrangement, the respective blow molding unit 10 or 12 with the frame structure 34 carrying it can be pivoted about the respective pivot axis thereof in the direction indicated by the arrow 58 into a position which corresponds to the position of the blow molding unit 12 in FIG. 1.

Reference is now made to FIGS. 4 and 5 showing a possible configuration of the drive means which are required for producing that pivotal movement. The drive means in this embodiment involves a piston-cylinder unit 72 comprising a cylinder 74 which is mounted pivotably on a suitable support 75 while the free end of the piston rod 76 can be releasably mounted pivotably to the frame structure 34 of the blow molding unit 10 or 12 which is respectively in the removal station where the hollow body is removed from the blow molding mold. For purpose each frame structure 34 is provided with an eye 77 to which the free end of the piston rod 76 can be mounted using a pin or bolt or the like. In the operating position of the blow molding units, as shown in FIGS. 1 and 2, the piston rod 76 is connected to the blow molding unit 12. By suitable actuation of the cylinder 74 the frame structure 34 with the blow molding unit is pivoted out of the position shown in FIG. 4 into that shown in FIGS. 1 and 5 and, later, back again into the position shown in FIG. 6. After that, the piston rod 76 is released from the frame structure 34 of the blow molding unit 12 in order to be connected to the frame structure 34 of the blow molding unit 10 after the two blow molding units have been moved into the position shown in FIG. 7. In other words, a common drive means is associated with all blow molding units, for movement thereof between the receiving position and the removal position.

In the pivoted position, the respective blow molding mold—when the components are in the position shown in FIG. 1 this is the blow molding mold 12a, b—is disposed beneath the extrusion head 44 which is indicated by a circle in FIG. 1. As, in the pivoted position, the blow molding unit with the frame structure 34 carrying it, at its end region remote from the respective pivot point 54 or 56, projects laterally relative to the respectively associated carriage 14 or 16, an additional support means 55 is arranged for additionally supporting the outwardly pivoted blow molding unit in the region beside the path of movement defined by the two rails 38, in such a way that the additional support means 55 additionally supports the end region of the blow molding unit which is remote from the respective pivot axis 54 or 56, during the pivotal movement of the blow molding unit and in the outwardly pivoted position thereof. For the purposes of effecting the pivotal movements, the carriages 14, 16 and/or the frame structures 34 and possibly the support means 55 may be provided with guide means and means for reducing friction, as is indicated for example in FIG. 15. The arrangements and measures required for that purpose are familiar to any man skilled in the art so that they do not need to be described in greater detail herein.

The mode of operation of the apparatus is described hereinafter, in particular with reference to FIGS. 4 through 9. The starting point taken is the position of the two blow molding units shown in FIG. 4, in which the blow molding units 10 and 12 extend parallel to each other and to the path of movement defined by the rails 38. That position is referred to hereinafter as the 'linear' position. In that situation, the blow molding unit 12 is dispossed laterally beside the extrusion head 44 in the removal position, as shown in FIG. 4. The blow molding mold 12a, 12b is in an open condition. In other words, the two blow molding mold parts 12a, and 12b are moved away from each other and are at a spacing from each other. The blow molding mold 12a, 12b was opened so that, in the position of the blow molding unit 12 shown in FIG. 4, the hollow body produced in the preceding working cycle can be removed from the blow molding mold.

Starting from the linear position shown in FIG. 4, the blow molding unit 12 with the blow molding mold in the open condition is pivoted about the associated pivot axis 56 in the direction indicated by the arrow 58 into the receiving position indicated at 45 in FIG. 5 in which the opened blow molding mold 12a, 12b is disposed beneath the extrusion head 44. Although, in a continuous extrusion process, at the moment of the pivotal movement into the receiving position shown in FIG. 5, the preform which is to be received by the blow molding mold 12a, 12b will be of almost its target or reference length which is required for the production of a hollow body, the pivotal movement can be produced without involving any contact between the preform and any components of the blow molding unit. The strut 28 which is at the front in the direction of movement as indicated by the arrow 58 is arranged so low that it passes beneath the free end of the preform which hangs from the extrusion head. The strut 30 which is the upper strut and which is the trailing strut in the direction of movement as indicated by the arrow 58 remains outside the region within which the preform is disposed. The two blow molding mold parts 12a and 12b are moved apart to such an extent that, in the receiving position, they are disposed laterally of the preform which hangs from the extrusion head 44, as can be clearly seen from FIG. 5.

When the preform has reached at least its target or reference length, and this will generally be the case immediately after termination of the pivotal movement in the direction indicated by the arrow 58, the blow molding mold is closed by moving the two blow molding mold parts 12a, 12b together. In that operation, the preform is received by the blow molding mold and at least partially pressed together and closed at its top and its bottom. FIG. 1 shows in solid lines the positions of the parts when the blow molding mold unit 12 is pivoted and the mold is closed, that is to say immediately after the mold has received the preform. After that, the preform is expanded by means of an increased internal pressure. It will be noted in that respect that air or another gas may also already be introduced into the preform when it is still suspended from the extrusion head 44. The man skilled in the art is familiar with the procedures and steps relating to closure of the mold and resulting enclosure of the preform in the blow molding mold. After the blow molding mold 12a, b is closed, the closed mold is pivoted out of the receiving position shown in FIG. 5 into the position shown in FIG. 6, in the direction indicated by the arrow 60, back into the removal position in which the blow molding unit 12 again adopts its linear position.

After that, the two blow molding units 10 and 12 are displaced in the substantially horizontal plane in the direction indicated by the arrow 18 (see FIG. 2), that is to say towards the right into the position shown in FIG. 7 in which the blow molding unit 10 is in the removal station, that is to say beside the extrusion head 44. The position which the blow molding unit 12 adopts in that situation is shown in broken line on the right in FIG. 1. Normally, the preform in the blow molding mold 12a, 12b will be expanded at the time of reaching the position shown in FIG. 7, so that the operation of cooling the hollow body which has been produced from the preform and which bears against the wall of the mold cavity of the blow molding mold 12a, 12b is already effected here. These procedures are also generally known to the man skilled in the art so that there is no need of further description thereof herein.

After the arrangement reaches the removal position shown in FIG. 7 the blow molding mold 10a, b of the blow molding unit 10 is opened, as shown in FIG. 7, so that the hollow body which was produced previously can be removed from the blow molding mold 10a, b. For that purpose, associated with the removal station B is a removal device 62 (see FIG. 1) which is provided with a gripper 64. The gripper 64 is carried by a guide 66 along which the gripper 64 is reciprocable approximately perpendicularly to the linear directions of movement indicated by the arrows 17 and 18. FIG. 1 shows the gripper 64 in the closed condition. In other words, the two members forming the gripper 64 are bearing against each other. More specifically, the operation of removing the hollow body from the blow molding mold 10a, b which is disposed in the station B in a linear position, that is to say the removal position, can be effected by a procedure whereby, as soon as the components have reached the positions shown in FIG. 7, the gripper 64 is moved into the position shown in FIG. 1 in order to grip the waste portion, which projects upwardly out of the blow molding mold, of the hollow body which is disposed in the mold. That waste portion had been squeezed off the preform by the two mold ports when the blow molding mold was closed around the preform in the receiving station 45. After the gripper 64 has engaged the above-mentioned waste portion, the blow molding mold 10a, b can be opened so that the mold parts 10a and 10b occupy the position shown in FIG. 7. The gripper 64 can now be moved along the guide 66 into the position shown in broken lines in FIG. 1 and indicated at 64a. In the course of that movement, the hollow body is removed from the open blow molding mold 10a, b. Preferably prior to that movement .taking place any parts which project into the hollow body through openings in the wall thereof, such as a blowing mandrel or tube or the like, are pulled out of the hollow body. When the gripper 64 is in the position 64a, the hollow body carried thereby is disposed above a conveyor 68 on to which the hollow body is deposited in order to be passed for further subsequent processing by any items of equipment.

As soon as the hollow body has been gripped by the gripper 64 and the blow molding mold has been opened, the blow molding unit 10, with the blow molding mold in the open condition, is pivoted into the receiving station beneath the extrusion head 44. The pivotal movement of the blow molding unit 10 can therefore begin before the removal gripper 64 has reached the position 64a. That pivotal movement corresponds to the pivotal movement of the blow molding unit 12 in the direction of the arrow 58, as described with reference to FIG. 5. For that purpose, after the arrangement reaches the position shown in FIG. 7, the piston rod 56 of the piston-cylinder unit 72 (see FIGS. 4 and 5) has been connected to the frame structure 34 of the blow molding unit 10.

In the receiving station, the blow molding mold 10a, b is closed around the preform 46 in the manner already described above in relation to the blow molding mold 12a, b, and then, by actuation of the piston-cylinder unit 72, pivoted in the direction indicated by the arrow 60 back into the linear position in which the blow molding mold 10a, b is disposed in the removal station. That position is shown in FIG. 9. After that, the two blow molding units 10 and 12 are moved in the direction indicated by the arrow 17 into the starting position shown in FIG. 4. In this case however, unlike the situation shown in FIG. 4, the blow molding mold 12a, b is still closed. In other words, the blow molding mold 12a, b is now disposed in the removal station. The previously produced hollow body is then removed in the manner already described in connection with the blow molding mold 10 with reference to FIG. 7, the parts then again occupying the positions shown in FIG. 4.

FIG. 1 in particular shows that the blow molding unit 10 is reciprocated between the stations A and B and the blow molding unit 12 is reciprocated between the stations B and C. It will be seen that this arrangement therefore provides that it is not only the same receiving station that is used by the two blow molding units for receiving the preform, as is hitherto generally conventional practice. On the contrary, the arrangement has only one common position for also effecting removal of the hollow bodies which have been expanded in both the blow molding units 10 and 12, so that the devices required for removal of the hollow bodies, such as for example including the piston-cylinder unit 72, need to be provided only once. A further major advantage of the apparatus according to the invention is that the supply of any parts into the blow molding mold can be effected at the same location for both blow molding units, more specifically when the blow molding mold is in the removal and/or the receiving position. FIG. 1 more particularly shows that the blow molding mold which is in the receiving position is accessible both from the side at which the strut 28 is disposed and also from the side at which the support 24 is disposed. It is therefore readily possible for any insertion parts which are to be joined in the blow molding mold to the hollow body to be produced from the preform therein to be introduced into the mold, as long as the mold is still open, while the mold is in the receiving position. The step of mounting such additional parts to the hollow body within the blow molding mold is frequently required in particular in relation to large-size containers, for example motor vehicle tanks.

It will be noted that the invention is not restricted to a construction with only two blow molding units. Thus FIGS. 10 through 12 show an embodiment having three blow molding units 110, 111 and 112 which are also arranged and disposed as was described hereinbefore in connection with the embodiment shown in FIGS. 1 through 9. Accordingly the same components are also denoted by the same references which however are higher by 100 in relation to the embodiment shown in FIGS. 10 through 12.

At the beginning of the operating procedure, described hereinafter, of an apparatus having three blow molding units 110, 111 and 112, the blow molding unit 112 which is disposed at the right in the views shown in FIGS. 10 through 12 is disposed in the station B in which the preform is received by the blow molding mold when the latter is in its pivoted position and the expanded hollow body is removed from the blow molding mold when the latter is in its linear position. In FIG. 10 the blow molding unit 112 is pivoted into the receiving position so that the blow molding mold 112a, 112b is disposed beneath the extrusion head 144. FIG. 10 shows the position of the apparatus components immediately after the blow molding mold 112a, 112b has closed around the preform hanging from the extrusion head 144. Immediately thereafter, the blow molding mold is pivoted beck in the direction indicated by the arrow 158 into its linear position in which it extends parallel to the other blow molding units 110 and 111. The return pivotal movement into that linear position is generally effected immediately after closure of the blow molding mold in order to provide space beneath the extrusion head for the preform which is continuously issuing therefrom. The preform is separated from the extrusion head in the pivotal movement from the receiving position into the linear position.

After the blow molding unit 112 has reached its linear position, the three blow molding units 110, 111 and 112 are displaced by approximately the length of a blow molding unit in the direction indicated by the arrow 118, that is to say, towards the right, so that the middle blow molding unit 111 passes into the station B while the blow molding unit 112 which has now received the previously produced preform is now in station C in which the step of cooling the hollow body which in the meantime has been expanded in the blow molding mold 112a, 112b begins.

As, in a preceding working cycle, the blow molding unit 111 had already received a preform and expanded it to constitute a hollow body, the blow molding mold 111a, 111b contains a hollow body which first has to be removed from the blow molding mold before the mold can receive the following preform which is being extruded in the meantime. Therefore, when it passes into the station B, the blow molding mold 111a, b firstly opens so that the apparatus components are in the position shown in FIG. 4 in relation to the blow molding unit 12. Then, the expanded hollow body is removed from the mold and possibly transported to downstream-disposed treatment stations in the manner already described with reference to FIG. 1, using a gripper or other means. The blow molding unit 111 with the emptied open blow molding mold is then pivoted into the position shown in FIG. 11, that is to say into the receiving position, in the direction indicated by the arrow 160, and pivoted back into the linear position in the direction indicated by the arrow 158, after having received the preform.

In the course of the subsequent further displacement of the three blow molding units 110, 111 and 112 in the direction of the arrow 118, that is to say towards the right, the third blow molding unit 110 passes into the station B, in which case the blow molding unit 112 is displaced out of the station C into the station D and the blow molding unit 111 is displaced out of the station B into the station C. The hollow body which in the meantime has been expanded in the blow molding mold 111a, b begins to be subjected to the cooling procedure in the station C. At the same time time, cooling of the hollow body in the blow molding mold 112a, b is continued in the station D.

In station B, with the blow molding unit 110 initially in the linear position, the hollow body which was produced in the previous working cycle is removed in the manner already described above. The opened blow molding mold is then pivoted into the receiving position shown in FIG. 12. FIG. 12 also shows the blow molding mold 110a, b in the condition of already being closed, that is to say immediately before the beginning of the pivotal movement in the direction of the arrow 158 back into the linear position. As soon as that position is reached, the blow molding units 110, 111, 112 are moved from the position shown in FIG. 12 back into the position shown in FIG. 10, that is to say into the starting position, in the direction indicated by the arrow 117. Thereafter, the hollow body which was previously produced is then removed from the blow molding mold 112a, b which is now disposed in the station B, and the blow molding unit 112 is then pivoted again in the direction indicated by the arrow 160 into the receiving position shown in FIG. 10, whereupon the above-described operating procedures are repeated.

FIG. 24 depicts a modified version of the apparatus of FIGS. 1–12 in which a single carriage 714 is provided carrying at least two of the blow molding units 10 and 12. It will be appreciated that a single carriage carrying multiple blow molding units can be provided in any of the subsequently described embodiments of the invention.

The embodiment shown in FIGS. 13 and 14 corresponds in respect of its fundamental structure to the embodiment shown in FIGS. 1 through 9 so that corresponding components are also denoted by the same references but increased by 200. This apparatus also has two blow molding units 210, 212 which are moved alternately into the removal station and then pivoted into the receiving position. The essential difference in relation to the embodiment shown in FIGS. 1 through 9 is that the carriage 214 and 216 respectively is greater in width so that each frame structure 234, in its condition of being pivoted into the receiving position 245, is also supported by the respective carriage 214, 216 to such an extent that it does not need any additional support or guide means. Accordingly, the two rails 238 which form the track for the carriages 214, 216 are also at a greater spacing from each other. In this case also, similarly to the embodiment shown in FIGS. 1 through 9, the apparatus may have a common drive means for producing the pivotal movements between the removal position and the receiving position. It is however also possible to envisage other arrangements as are described hereinafter in connection with further embodiments.

In the embodiment shown in FIG. 15 which, for the sake of simplicity, shows only one carriage whose fundamental structure however is also the same as that shown in FIGS. 1 through 9 so that the same components are denoted by the same references but increased by 300, associated with each blow molding unit 310, 314 is its own drive means in the form of a piston-cylinder unit 372 for producing the pivotal movements between the removal position and the receiving position. In this embodiment, the two carriages 314, 316 are coupled together by suitable releasable means 378 so that only the carriage 314 is provided with a drive motor 380 for the drive to a pair of wheels 336. The electric motor 380 drives a gear 381 which is fixedly mounted on a shaft 382 carrying the pair of wheels 336. The arrangement however may also be such that the gear 381 is engaged with a stationary rack disposed between the two rails 338, and in that way produces transportation movement of the two carriages 314, 316 in the directions indicated by the arrows 17 and 18. Such a drive arrangement, simple means, permits highly accurate positioning of the carriages in the station B. That is important for precise positioning of the blow molding mold, when receiving the preform.

The frame structures 334 which carry the blow molding units 310 and 312 respectively are provided at their ends remote from the respective pivot points 354 and 356, with wheels or rollers 384 which run on a support means 355. At its end remote from the rails 338, the support means 355 is provided with a stop 386 determining the position of the frame structure 334 and therewith the respectively associated blow molding unit, in the receiving position. The blow mold unit is not shown in FIG. 15, for the sake of clarity of the drawings.

The above-described push-pull clamping system comprising the three plates is particularly advantageous when using the pivotal movement for bridging over the distance between the linear position and the receiving position, as the off-center arrangement of the blow molding mold, which is employed or possible in that system, makes it possible, at just a small amount of pivotal movement along the arcuate path, to move the blow molding mold into the region of the receiving station and thus out of the region of the removal station, in order to afford good accessibility from the end at which the support 24 is disposed. The only requirement in that respect is that the pivot axis 354 or 356 respectively is arranged near that end of the frame structure 334 from which the blow molding mold is most remote. The presence of the support 24 will in general not hinder accessibility to the internal region of the opened blow molding mold since, as not least FIG. 3 shows, there is sufficient room beneath the support 24 to have access to the region under the actual blow molding mold parts. The above-mentioned insertion parts to be fitted into the hollow body are mainly to be positioned in that region in order then to connect them to the preform or to the hollow body which is being formed therefrom.

It is also possible for the individual blow molding units to be moved from the linear removal position into the receiving position not by a pivotal movement, but rather by a movement which takes place perpendicularly to the directions of movement 17, 18 and which is thus approximately parallel to the guide 66 (see FIG. 1). In that case, when in the receiving position, the blow molding units also each adopt a position parallel to the linear position, in the removal station. Such an embodiment also enjoys all the above-mentioned advantages in regard to only one removal station and in regard to the possibility of using only one station for the introduction of any insertion parts to be fitted into the preform or the hollow body. However, the devices for producing reciprocating transverse movements in parallel relationship possibly involve a somewhat higher level of machine expenditure and also require a larger amount of space.

Referring now to the embodiment shown in FIGS. 16 and 17, insofar as the components correspond to those of the embodiment shown in FIGS. 1 through 9, they are denoted by the same references but increased by 400. The two blow molding units 410, 412 are also each carried by a respective frame structure 434 which however is not pivotable but is displaceable perpendicularly to the transportation directions 17, 18 of the two carriages 414, 416, on respective linear guides 488 carried by the carriages. In FIG. 16 the carriages 414, 416 occupy a position corresponding to the position of the carriages 14, 16 in FIG. 4 of the embodiment shown in FIGS. 1 through 9. In other words, the carriage 416 with the blow molding unit 412 disposed thereon is in the removal position, and therefore beside the receiving position which is determined by the extrusion head 444. After opening of the blow molding mold 412a, 412b and removal of the hollow body produced in the preceding working cycle, the frame structure 434 with the blow molding unit 412 thereon and with the blow molding mold still in the open condition is moved out of the position shown in FIG. 16 into that shown in FIG. 17, in order to receive the preform there. In that respect, it is also possible, in the receiving position and possibly additionally or alternatively also in the removal position, for any additional parts which are to be joined to the hollow body to be produced from the preform in the blow molding mold, to be fitted into the blow molding mold or mounted in position in some other way. After the blow molding mold 412a, 412b has been closed around the preform in the receiving station, the frame structure 434 with the blow molding unit 412 is moved along the guides 488 back into the position shown in FIG. 16 again, whereupon the other working steps then take place within the working cycle, in the usual way. In other words, the two carriages 414, 416, driven by a common drive or by separate drives, are moved towards the right so that the blow molding unit 410 moves into the removal position. The further working steps then take place in the manner already described above.

In this case also, similarly to the embodiment shown in FIGS. 13 and 14, the two carriages 414 and 416 are of such a width that the transverse movements of the respective frame structure 434, with the blow molding unit carried thereby, are produced on the respective carriage in the directions indicated by the arrows 493 and 494 respectively.

The embodiment shown in FIGS. 18 and 19 which show only one carriage and in which parts corresponding to those of the embodiment shown in FIGS. 1 through 9 are denoted by the same references but increased by 500 differs from all the above-described embodiments in that it is not just the respective blow molding unit that is reciprocated relative to the carriage, between the removal position and the receiving position. On the contrary, the carriage is moved in its entirety. In the embodiment shown in FIGS. 18 and 19, this movement involves a pivotal movement. For that purpose, the track which is formed by the rails 538 and on which the carriages are moved in the directions indicated by the arrows 17 and 18 is provided in the region of the removal station with a track portion which is arranged pivotably in a horizontal plane about a pivot point 554, relative to the other stationary track portions. Desirably, disposed beneath the pivotable track portion is a platform 590 or the like on which the pivotable track region 591 is supported by way of rollers or runners 584 carried thereby. The runners or rollers 584 run on a rail or other guide 595 which extends in a curved configuration, corresponding to the pivotal movement. The rail portion 591 is provided with an electric motor 572 which by way of suitable means, drives at least one of the two wheels 584. The end positions of the track portion 591 are determined by stops 586 and 587. This embodiment does not require a particular support frame structure or a particular frame assembly to carry the respective blow molding unit.

The embodiment shown in FIGS. 18 and 19 also has two or three carriages. However, if the carriages are connected together for the purposes of transportation movement in the directions 17 and 18, the carriages must be uncoupled for the purposes of performing the pivotal movements between the removal station and the receiving station, unless the arrangement uses special coupling means which permit such pivotal movements to take place. The blow molding unit is not shown in FIGS. 18 and 19, for the sake of clarity of the drawing.

The embodiment shown in FIGS. 20 through 23 differs from that shown in FIGS. 18 and 19 in particular by virtue of the fact that the distance between the removal station and the receiving station is not covered by a pivotal movement, but, similarly to the embodiment shown in FIGS. 16 and 17, by a linear displacement which takes place transversely relative to the rails for transportation of the carriages in the directions 17 and 18. Components corresponding to the embodiment shown in FIGS. 1 through 9 are denoted by the same references but increased by 600. The movements in the directions of the arrows 693 and 694 make it necessary to provide a correspondingly displaceably arranged track portion 691 which is carried by a carriage 695. As FIGS. 20 and 21 in particular show, the arrangement is such that the rollers 636 for transportation movement of the blow molding units in the directions 17 and 18 are mounted on the component 634 which corresponds to the frame structure 34 of the embodiment shown in FIGS. 1 through 9. The position occupied by the two blow molding units in FIGS. 20 and 22 corresponds to the position of the corresponding blow molding units in FIG. 4. In other words, one of the two blow molding units, namely the blow molding unit 612, is in the removal station laterally beside the receiving position. In that station, the blow molding unit 612 with the associated frame structure 634 is carried by the displaceably arranged track portion 691, the rail portions of which are aligned with the stationary rail portions 638. As soon as the blow molding unit 612, in the course of the transportation movement in the direction of the arrow 17 or 18, has reached the removal station shown in FIGS. 20 and 21, a piston 696 which is arranged in a cylinder 697 is displaced, so that a pin carried by the piston 696 is introduced into a recess 698 of corresponding cross-section, in the carriage 695. As the piston 696 and the cylinder 697 are mounted on the frame structure 634, the above-mentioned pin, when in its lower operative position in the recess 698, produces a positively locking connection between the frame structure 634 and the carriage 695 so that those two components are no longer movable relative to each other. After the hollow body produced in the preceding working cycle has been removed from the blow molding unit 612 and possibly after any necessary insertion portions have been fitted into the blow molding mold in the removal station, the blow molding unit 612 is moved into the position shown in FIGS. 21 and 23, by suitable displacement of the carriage 695 in the direction of the arrow 693. In that position as shown in FIGS. 21 and 23, the opened blow molding mold is disposed beneath the extrusion head 644. Then, in the receiving station, after insertion portions have possibly there been introduced into the blow molding mold, the preform which is hanging from the extrusion head 644 is received by the closing blow molding mold, whereupon the blow molding unit 612 is moved back into the starting position shown in FIGS. 20 and 22 in the direction indicated by the arrow 694 (see FIG. 22). After the locking engagement of the pin into the recess 698 has been released, there then occurs the displacement in the direction indicated by the arrow 18, as has already been described above in connection with the other embodiments. In the course of that movement, the other blow molding unit 610 passes into the removal station and thus on to the track portion which is carried by the carriage 695.

Figure 20:
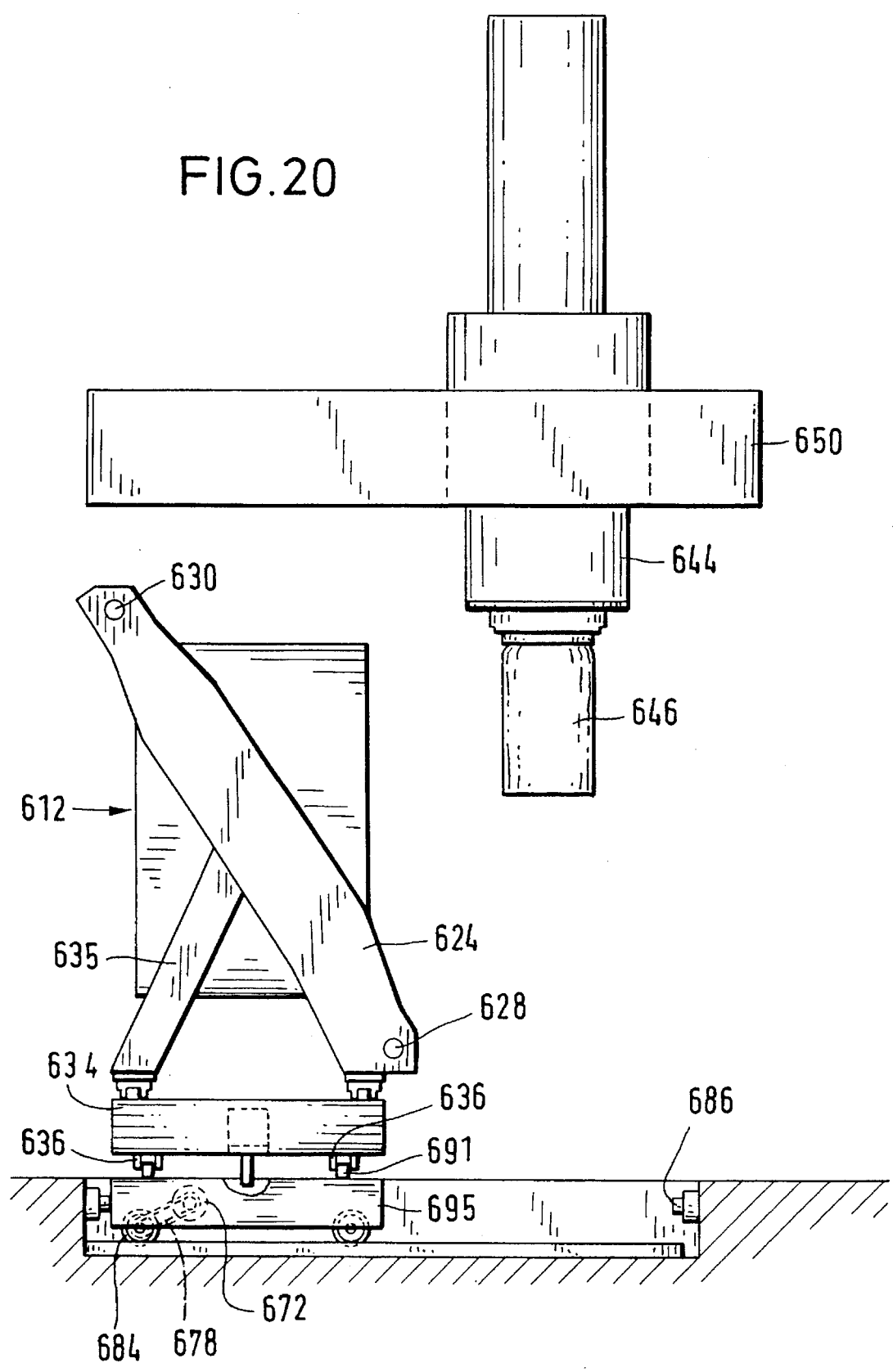
FIG. 20 shows a view corresponding to FIG. 3 of a further embodiment.

FIGS. 20 through 23 show two alternative configurations in regard to the drive for producing the movements of the carriage 695. In FIGS. 20 and 21, disposed in the carriage 695 is an electric motor 672 which by way of a chain or the like, drives one of the wheels 684 or pairs of wheels of the carriage 695.

In FIGS. 22 and 23 which each show only one carriage for the sake of simplicity, the transverse movement is produced by a piston-cylinder unit 672 whose cylinder 674 can be mounted on a suitable support and whose piston rod 676 can be fixedly connected to the carriage 695. There is no need for the piston rod to be releasably mounted, in a manner corresponding to the embodiment shown in FIGS. 1 through 9, as both or possibly also all three blow molding units are reciprocated with the respectively associated frame structure by the same carriage 695 between the removal station and the receiving position. It will be appreciated that in this case also, if the carriages are provided with a common drive for producing the transportation movements in the directions of the arrows 17 and 18, the carriages must be uncoupled in order to permit the transverse movement of the respective carriage in the removal station. The blow molding unit is not shown in FIGS. 22 and 23 for the sake of clarity of the drawing.

In the embodiment shown in FIGS. 1 through 9, all blow molding units of an extrusion blow molding apparatus are arranged on the carriage 14, 16 and the frame structures 34, in such a way that the pivotal movements between the removal position and the receiving position each occur in the same direction. It will be appreciated that it is also possible to use an arrangement in which, unlike the illustrated embodiment, the pivot axis for example of the blow molding unit 12 would be arranged at the right-hand end region of the carriage 16, in which case it would then also be advantageous for the blow molding unit to be arranged on the associated frame structure 34, in a position of being pivoted in total through 180° about a vertical axis. In that case the blow molding unit 12 would perform a movement in a clockwise direction upon pivoting from the removal position into the receiving position, whereas in the case of the blow molding unit 10, the pivotal movement would still be in the counter-clockwise direction. That would not be an optimum arrangement if, as is frequently the case, the discharge opening of the extrusion head 44 for the preform is of a different configuration in the peripheral direction and is thus not of a symmetrical profile. In general it is desirable and possibly even necessary for the blow molding mold and thus the blow molding cavity, in the receiving position, to be adapted in a specific manner to a peripheral profiling of the tubular preform in order to be able to produce a hollow body which is of the optimum configuration.

The embodiment of FIGS. 10 through 12 shows that the concept of the present invention not only permits an arrangement in which certain operations and manipulation steps of a given kind, which are to be carried out on a blow molding mold or in connection with a blow molding mold, can be performed for all blow molding molds in a working region that is common to the blow molding molds, but that in addition the degree of flexibility, in regard to the number of blow molding molds, is substantially greater than is the case with known machine designs.

Thus, it is also possible for two extrusion blow molding apparatuses according to the invention to be arranged in side-by-side relationship, in such a way that the removal stations of the two apparatuses are disposed opposite each other, and therefore both would be arranged in the station B in the case of the above-described embodiments. In that case, it is only necessary that, at any event in the station in which the expanded hollow bodies are removed from the respective blow molding molds, the distance between the two apparatuses which advantageously extend substantially parallel to each other is such that removal grippers or other removal devices can be disposed between the two apparatuses. In that case, a con, non transportation means is sufficient for the two apparatuses, for transporting the produced hollow bodies away. It would even be possible for a common removal device to be associated with both the apparatuses. However, this and other details of the design configuration adopted depend on the respective circumstances involved, for example the time required for removal of the hollow body from a blow molding mold and for deposit of the hollow body on a conveyor. It is also possible for the two apparatuses to be arranged somewhat displaced relative to each other in the longitudinal direction, that is to say, parallel to the directions in which the individual blow molding units are moved between the stations, in such a way that the blow molding molds are not disposed precisely opposite each other in the common removal station, but are somewhat displaced relative to each other; in that way, for example with a small spacing between the two apparatuses, the two removal devices can be arranged in such a way that they are then displaced by the appropriate dimension in the direction of the arrows 17 and 18.

When two such apparatuses are arranged in substantially parallel relationship, as described above, the blow molding units would be pivoted into the receiving station from the removal station in an outward direction, that is to say in each case away from the respective other apparatus.

It is further possible if necessary for the extrusion blow molding apparatus to be operated only with one blow molding unit. In that case the respective carriage or slider would only perform movements between a receiving position and a removal position. That is important in particular for the reason that, for example in all the above-discussed embodiments, it would be possible for the overall assembly to continue with operation, with only one blow molding unit, in a breakdown situation or when carrying out maintenance operations, when only one blow molding unit can be used.

Although, in the above-described embodiments of the invention, the position in which the blow molding mold receives the preform is associated with the extrusion head in such a way that the blow molding mold is closed around the preform when it is hanging from the extrusion head, the invention is in no way restricted to that configuration. It is also possible for the receiving station to be arranged independently, that is to say spaced away from the extrusion head. It will be appreciated that in that case means would have to be provided for transporting the preform from the extrusion head into the receiving station. Such a means could be for example a gripper which engages the preform at the extrusion head and, after the preform has been separated or severed from the extrusion head, moves the preform into the receiving station. That may involve a movement in a horizontal or a vertical plane, but possibly also a combination of such movements.

It will be appreciated that the above-described embodiments of the apparatus according to the invention have been set forth purely by way of example and illustration thereof and that various modifications and alterations may be made therein without thereby departing from the spirit and scope of the invention.

What is claimed is:

1. Apparatus for the production of hollow bodies from thermoplastic material by extrusion blow molding, comprising an extrusion system having at least one extrusion head means for extruding preforms; at least two blow molding units, each unit including at least one blow molding mold divided into at least first and second parts and drive means for reciprocating the parts of the respective blow molding mold between an open condition in which the parts are at a spacing from each other and a closed condition in which the parts bear against each other and define a mold cavity whose contour corresponds to a configuration of a hollow body to which an extruded preform is expanded in the cavity by an increased internal pressure; motion means for moving each blow molding unit between a receiving position in which the blow molding mold in an opened condition is oriented to receive the extruded preform and at least one other removal position at a removal station, the receiving position being with the removal station; and removal means with the removal station for removing an expanded preform from an open blow molding mold in the removal position at the removal station; the improvement wherein the motion means moves each blow molding unit from a station remote from the removal station in at least one direction in a first movement into the removal station, the drive means opens the blow molding unit at least by a time when the blow molding unit is located in the removal station, the removal means removes from the blow molding mold a hollow body previously produced in the blow molding mold and then the motion means moves the blow molding unit in a second movement in a direction transverse to the one direction with the blow molding mold open into the receiving position, the receiving position being laterally displaced relative to the path of movement along which the blow molding unit is moved into the removal station.

2. Apparatus as set forth in claim 1 wherein the second movement of the blow molding unit from the removal position into the receiving position is generally perpendicular to the first movement of the blow molding unit into the removal station.

3. Apparatus as set forth in claim 2 wherein said motion means move the at least two blow molding units into the receiving position in the same direction.

4. Apparatus as set forth in claim 2 wherein said motion means move the at least two blow molding units into the receiving position in opposite directions.

5. Apparatus as set forth in claim 2 wherein the motion means comprises a drive means with each blow molding unit for moving the blow molding unit between the removal position and the receiving position.

6. Apparatus as set forth in claim 2 wherein the motion means comprises a stationary located drive means for moving each respective blow molding unit between the removal position and the receiving position, and means for alternately connecting the stationary located drive means to the respective blow molding units moved into the removal station, each blow molding unit being reciprocable between the removal position and the receiving position.

7. Apparatus as set forth in claim 1 including means for pivotal movement of the blow molding unit from the removal position into the receiving position.

8. Apparatus as set forth in claim 7 wherein said motion means move the at least two blow molding units into the receiving position in the same direction.

9. Apparatus as set forth in claim 7 wherein said motion means move the at least two blow molding units into the receiving position in opposite directions.

10. Apparatus as set forth in claim 7 including a carriage which carries the blow molding unit, and means for movement of said carriage between the receiving position and the removal position by means of a pivotal motion about a pivot axis.

11. Apparatus as set forth in claim 10 wherein the pivot axis of said pivotal motion is arranged at a side of the blow molding unit, which side is remote from the blow molding mold.

12. Apparatus as set forth in claim 7 wherein the motion means comprises a drive means with each blow molding unit for moving the blow molding unit between the removal position and the receiving position.

13. Apparatus as set forth in claim 7 wherein the motion means comprises a stationary located drive means for moving each respective blow molding unit between the removal position and the receiving position, and means for alternately connecting the stationary located drive means to the respective blow molding units moved into the removal station, each blow molding unit being reciprocable between the removal position and the receiving position.

14. Apparatus as set forth in claim 1 wherein movements of the at least two blow molding units between the removal station and a station remote therefrom take place synchronously.

15. Apparatus as set forth in claim 1 wherein all blow molding units are moved to only one removal station and only one receiving station.

16. Apparatus as set forth in claim 1 wherein each blow molding mold has carrier plates which extend substantially perpendicularly to the direction in which the blow molding unit is moved into the removal station.

17. Apparatus as set forth in claim 1 wherein the receiving position is positioned directly beneath the extrusion head.

18. Apparatus as set forth in claim 1 wherein the motion means is adapted for moving all blow molding units to a single common position where an additional portion to be joined to said hollow body is introduced into the blow molding mold.

19. Apparatus as set forth in claim 1 wherein the blow molding units comprise push-pull clamping systems.

20. Apparatus as set forth in claim 1 including a common carriage for all blow molding units.

21. Apparatus as set forth in claim 1 including a respective individual carriage for each blow molding unit.

22. Apparatus as set forth in claim 21 wherein the individual carriages are movable independently of each other.

23. Apparatus as set forth in claim 21 including means for driving the individual carriages independently of each other.

24. Apparatus as set forth in claim 21 including means for movement of the carriage which carries the blow molding unit between the removal position and the receiving position.

25. Apparatus as set forth in claim 24 including means for movement of the carriage which carries the blow molding unit from the removal position into the receiving position perpendicularly to the first movement of the blow molding unit into the removal station.

26. Apparatus as set forth in claim 1 including a carriage, a frame structure carrying a respective blow molding unit and mounting means for mounting the frame structure on the carriage movably between the removal position and the receiving position.

27. Apparatus as set forth in claim 26 including means for movement of the frame structure between the removal position and the receiving position relative to the carriage generally perpendicularly to the one direction by means of which the respective blow molding unit is movable into the removal station.

28. Apparatus as set forth in claim 26 wherein said mounting means mount the frame structure pivotally on the respective carriage for pivotal motion about a pivot axis.

29. Apparatus as set forth in claim 28 wherein the pivot axis of said pivotal motion is arranged at a side of the blow molding unit, which side is remote from the blow molding mold.

30. Apparatus as set forth in claim 1 wherein the extrusion system with the at least one extrusion head has means for extruding each preform with a multi-layer wall.

31. Apparatus as set forth in claim 1 wherein movements of the blow molding units between the stations and between the removal position and the receiving position take place in a substantially horizontal plane.

32. Apparatus as set forth in claim 1 wherein the stations remote from the removal station are arranged in substantially linearly aligned relationship, whereby the movements between said stations take place along substantially linear paths of movement.

33. Apparatus for the production of hollow bodies from thermoplastic material by means of extrusion blow molding, comprising: an extrusion system having at least one extrusion head means for extruding preforms; at least two blow molding units, each unit including at least one blow molding mold divided into at least first and second parts and drive means for reciprocating the parts of the respective blow molding mold between an open condition in which the parts are at a spacing from each other and a closed condition in which the parts cooperate with each other to define a mold cavity whose contour corresponds to a configuration of a hollow body to which an extruded preform is to be expanded in the mold cavity by an increased internal pressure; a removal station including removal means for removing an expanded hollow body from the respective blow molding mold at the removal station; at least one other station spaced from the removal station; first motion means for moving the blow molding units along a first path of movement between said removal station and at least one other station; second motion means for moving the blow molding mold of each blow molding unit along a second path of movement between a receiving position, which is located laterally displaced relative to the first path of movement along which the blow molding unit is moved into the removal station and in which the parts of the blow molding mold in an opened condition are oriented to receive an extruded preform from the extrusion head means, and a removal position at the removal station at which an expanded hollow body is removed from the blow molding mold, the first motion means, the second motion means, the drive means, the removal means and the extruder head means all operating cyclically such that in an operating cycle, each blow molding unit is firstly moved along said first path of movement into the removal station and is opened at least while in the removal station, whereupon a hollow body previously produced in that blow molding mold is removed and then the blow molding unit is moved in a second movement along said second path of movement with the blow molding mold open into the receiving position where the open blow molding mold receives a preform from the extrusion head means.

* * * * *